US011236819B1

United States Patent
Fujii et al.

(10) Patent No.: US 11,236,819 B1
(45) Date of Patent: Feb. 1, 2022

(54) GEAR-SHIFT CONTROL DATA GENERATION METHOD, GEARSHIFT CONTROL DEVICE, AND GEAR-SHIFT CONTROL SYSTEM

(71) Applicant: TOYOTA JIDOSHA KABUSHIKI KAISHA, Toyota (JP)

(72) Inventors: Kota Fujii, Nisshin (JP); Atsushi Tabata, Okazaki (JP); Koichi Okuda, Toyota (JP); Ken Imamura, Toyota (JP); Hideaki Bunazawa, Nagoya (JP); Keita Sasaki, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/344,369

(22) Filed: Jun. 10, 2021

(30) Foreign Application Priority Data

Jul. 28, 2020 (JP) .............................. JP2020-127658

(51) Int. Cl.
*F16H 61/00* (2006.01)
*F16H 61/02* (2006.01)

(52) U.S. Cl.
CPC . *F16H 61/0265* (2013.01); *F16H 2061/0087* (2013.01); *F16H 2061/0096* (2013.01); *F16H 2061/0223* (2013.01)

(58) Field of Classification Search
CPC ......... F16H 61/0265; F16H 2061/0096; F16H 2061/0223; F16H 2061/0087
See application file for complete search history.

(56) References Cited

U.S. PATENT DOCUMENTS

| 5,722,913 | A | 3/1998 | Gierer | |
|---|---|---|---|---|
| 6,259,983 | B1* | 7/2001 | Tsutsui | F16H 61/0437 180/233 |
| 2004/0204279 | A1* | 10/2004 | Oshima | F16H 61/061 475/43 |
| 2008/0300106 | A1* | 12/2008 | Shibata | F16H 61/067 477/156 |

(Continued)

FOREIGN PATENT DOCUMENTS

| DE | 44 05 806 A1 | 8/1995 |
|---|---|---|
| DE | 11 2010 005 964 T5 | 8/2013 |

(Continued)

*Primary Examiner* — Justin Holmes
(74) *Attorney, Agent, or Firm* — Oliff PLC

(57) ABSTRACT

A gear-shift control data generation method executed by an execution device in a state where relational regulation data used for regulating a relationship between a state of a vehicle and an action variable associated with an operation of a transmission is stored includes a process for acquiring the vehicle state, a process for operating the transmission, a process for assigning, based on the vehicle state, a higher reward when a characteristic of the vehicle satisfies a criterion than when the characteristic does not satisfy the criterion, and a process for updating the relational regulation data by inputting, to an update mapping, the vehicle state, a value of the action variable, and a reward corresponding to the operation. The update mapping outputs the relational regulation data that is updated to increase an expected profit for the reward when the transmission is operated according to the relational regulation data.

11 Claims, 12 Drawing Sheets

(56) References Cited

U.S. PATENT DOCUMENTS

| | | | |
|---|---|---|---|
| 2010/0004835 A1* | 1/2010 | Kuwahara | B60W 10/06 701/59 |
| 2013/0210575 A1 | 8/2013 | Kumazaki et al. | |
| 2021/0114580 A1 | 4/2021 | Hashimoto et al. | |

FOREIGN PATENT DOCUMENTS

| | | |
|---|---|---|
| JP | 2007-064464 A | 3/2007 |
| JP | 2021-67201 A | 4/2021 |

* cited by examiner

GEAR-SHIFT CONTROL DATA GENERATION METHOD, GEARSHIFT CONTROL DEVICE, AND GEAR-SHIFT CONTROL SYSTEM

CROSS-REFERENCE TO RELATED APPLICATION

This application claims priority to Japanese Patent Application No. 2020-127658 filed on Jul. 28, 2020, incorporated herein by reference in its entirety.

BACKGROUND

1. Technical Field

The present disclosure relates to a gear-shift control data generation method, a gear-shift control device, and a gear-shift control system.

2. Description of Related Art

For example, Japanese Unexamined Patent Application Publication No. 2007-64464 describes a control device that switches a gear ratio by operating a solenoid valve that adjusts an oil pressure by assigning an oil pressure command value for hydraulic oil of a transmission.

SUMMARY

In order to set an operation amount for switching the gear ratio to an appropriate value, such as the oil pressure command value, the knowledge of an expert and a large number of man-hours for adjusting are required.

Hereinafter, a configuration according to the present disclosure and its advantageous effect will be described.

A first aspect of the present disclosure is a gear-shift control data generation method executed by an execution device in a state where relational regulation data used for regulating a relationship between a state of a vehicle and an action variable is stored in a storage device. The action variable is a variable associated with an operation of a transmission mounted on the vehicle. The gear-shift control data generation method includes an acquisition process for acquiring the state of the vehicle based on a detection value of a sensor, an operation process for operating the transmission to switch a gear ratio, a reward calculation process for assigning, based on the state of the vehicle acquired by the acquisition process, a higher reward when a characteristic of the vehicle satisfies a criterion than when the characteristic does not satisfy the criterion, and an update process for updating the relational regulation data by inputting, to an update mapping determined in advance, the state of the vehicle acquired by the acquisition process, a value of the action variable used for the operation of the transmission, and a reward corresponding to the operation. The update mapping outputs the relational regulation data that is updated to increase an expected profit for the reward when the transmission is operated according to the relational regulation data. The criterion when the reward is assigned by the reward calculation process is defined for a combination of values of a first variable and a second variable that are two from among four variables of a gear-shift time required for switching the gear ratio, a heat generation amount of the transmission during a period of switching the gear ratio, an amount in which a rotation speed of an input shaft during the period of switching the gear ratio exceeds a reference rotation speed, and an impact amount generated when switching the gear ratio.

In the above method, it is possible to grasp what type of reward is obtained by an operation of the transmission by calculating the reward associated with the operation. Then, based on the reward, it is possible to set an appropriate relationship between the state of the vehicle and the action variable by updating the relational regulation data using the update mapping according to reinforcement learning. Therefore, man-hours required for an expert when setting the appropriate relationship between the state of the vehicle and the action variable can be reduced.

However, when a reward is independently assigned according to a value of the first variable representing one of two required elements for switching the gear ratio and a value of the second variable representing the other of the two required elements, the reinforcement learning may be executed so as to obtain a high reward by ignoring one of the two required elements and satisfying the other. Therefore, in the above method, instead of assigning the reward for the first variable and the second variable independently from each other, a criterion for assigning a reward is defined for a combination of the values thereof. As a result, it is possible to assign a high reward when each of the two required elements is satisfied in a well-balanced manner, and further, to learn the value of the action variable that satisfies at least two required elements in a well-balanced manner by the reinforcement learning.

In the first aspect, the criterion when the reward is assigned by the reward calculation process may be defined for a combination of values of the first variable, the second variable, and a third variable that are three of the four variables.

With the above method, the criterion when the reward is assigned is defined for a combination of the values of the first, second, and third variables, such that the value of the action variable that satisfies at least three required elements in a well-balanced manner can be learned by the reinforcement learning.

In the first aspect, even in a combination where values of the respective variables are the same, the reward calculation process may include a process for changing a value of the reward according to at least one of two variables that are a torque variable representing torque applied to the transmission and a switching variable representing a type of switching the gear ratio.

Various items are required when switching the gear ratio, and priorities of a plurality of required elements may vary depending on the magnitude of the value of the torque variable or the type of gear-shift. For this reason, when the size of the reward is the same for a combination where values of a plurality of variables representing the required elements are the same regardless of the magnitude of the value of the torque variable or the type of gear-shift, it may be difficult to obtain a learning result that satisfies a required element having a high priority. Further, the degree of difficulty in satisfying each of the required elements in a predetermined criterion may vary depending on the value of the torque variable or the type of gear-shift. For this reason, when the size of the reward is the same for the combination where values of the variables representing the required elements are the same regardless of the magnitude of the value of the torque variable or the type of gear-shift, it may be difficult to satisfy the required elements. Therefore, in the above configuration, by changing the reward assigned for the combination of the values of the above variables according to the magnitude of the value of the torque variable or the type of gear-shift, it is possible to increase a certainty of obtaining the learning result that satisfies a required element having a high priority and to smoothly proceed with the learning.

In the first aspect, the storage device may store map data that has values of at least the first and second variables as input variables and has a value of the reward as an output variable. The reward calculation process may include a process for map-calculating the reward based on the values of the first and second variables.

With the above method, by using the map data that has the values of the first and second variables as the input variables, it is possible to easily increase a degree of freedom for setting the relationship between the values of the first and second variables and the reward.

In the first aspect, information on a plurality of phases into which the period of switching the gear ratio is divided may be referred to from the relational regulation data when the value of the action variable is determined by the relational regulation data.

In the above method, the period of switching the gear ratio can be divided into several sections due to variations in physical phenomena. Then, the value of the appropriate action variable can be greatly different for each divided section. Therefore, in the above method, when the value of the action variable is determined, the relational regulation data is used as the data from which the information on the phases into which the period of switching the gear ratio is divided is referred to. As a result, in learning an appropriate value of the action variable, since the labor of learning for identifying the section due to the variations in physical phenomena is saved, it is possible to find the value of the action variable that increases the profit at an early stage by the reinforcement learning.

In the first aspect, the phases may include a phase that is ended when transmitting torque by a friction engaging element is ended. The friction engaging element is switched from an engaged state to a released state by switching the gear ratio of the transmission.

A control that changes an operation amount of the transmission before and after a timing at which transmitting the torque by the friction engaging element that is switched from the engaged state to the released state by switching the gear ratio is ended tends to result in an optimum value adjusting by an expert. For this reason, by providing a phase that is ended at the timing, accumulation of knowledge of a past expert can be reflected in the reinforcement learning. Thus, it is possible to find the value of the action variable that actually increases a profit at an early stage by the reinforcement learning.

In the first aspect, a variable representing the state of the vehicle of which the relationship with the value of the action variable is regulated by the relational regulation data may include the torque variable representing torque applied to the transmission, the switching variable representing a kind of switching the gear ratio, and a temperature variable representing a temperature of hydraulic oil of the transmission.

An appropriate value of the action variable for satisfying each of the required elements in the predetermined criterion may vary depending on the value of the torque variable, the type of gear-shift, or the temperature of the hydraulic oil. For this reason, when a value of a common action variable is determined for different combinations of the torque variable, the type of gear-shift, and the temperature of the hydraulic oil, it may be difficult to satisfy the required elements. Therefore, in the above configuration, by including the magnitude of the value of the torque variable, the type of gear-shift, or the temperature of the hydraulic oil in the state for determining the value of the action variable, it is possible to smoothly proceed with the learning.

In the first aspect, a variable representing the state of the vehicle of which the relationship with the value of the action variable is regulated by the relational regulation data may include a variable representing a rotation state of the input shaft of the transmission.

The rotation state of the input shaft during the gear-shift period may vary depending on a value of the action variable during each gear-shift period. For this reason, in the above method, by including the variable representing the rotation state of the input shaft in the state, the value of the action variable thereafter can be determined according to the state generated as a result of the value of the action variable until then.

In the first aspect, the gear-shift control data generation method may include a process for generating gear-shift mapping data that receives the state of the vehicle as an input and outputs an operation amount of the transmission that maximizes the expected profit, by associating the state of the vehicle with the value of the action variable that maximizes the expected profit based on the relational regulation data, which is updated by the update process.

In the above method, the gear-shift mapping data is generated based on the relational regulation data learned by the reinforcement learning. For this reason, by mounting the gear-shift mapping data on a control device, it is possible to easily set the operation amount that maximizes the expected profit based on the state of the vehicle.

A gear-shift control device according to a second aspect of the present disclosure includes the execution device and the storage device in the gear-shift control data generation method. The operation process is a process for operating the transmission to switch the gear ratio based on the value of the action variable that is determined by the relational regulation data and the state of the vehicle, which is acquired by the acquisition process.

In the above configuration, the value of the action variable is set based on the relational regulation data learned by the reinforcement learning and the transmission is operated based on the value, such that the transmission can be operated so as to increase the expected profit.

A shift control system according to a third aspect of the present disclosure includes the execution device and the storage device in the gear-shift control data generation method. The execution device includes a first execution device mounted on the vehicle, and a second execution device separate from an in-vehicle device. The first execution device executes at least the acquisition process and the operation process, and the second execution device executes at least the update process.

In the above configuration, by executing the update process by the second execution device, a calculation load on the first execution device can be lower than when the update process is executed by the first execution device. The fact that the second execution device is separate from the in-vehicle device means that the second execution device is not an in-vehicle device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
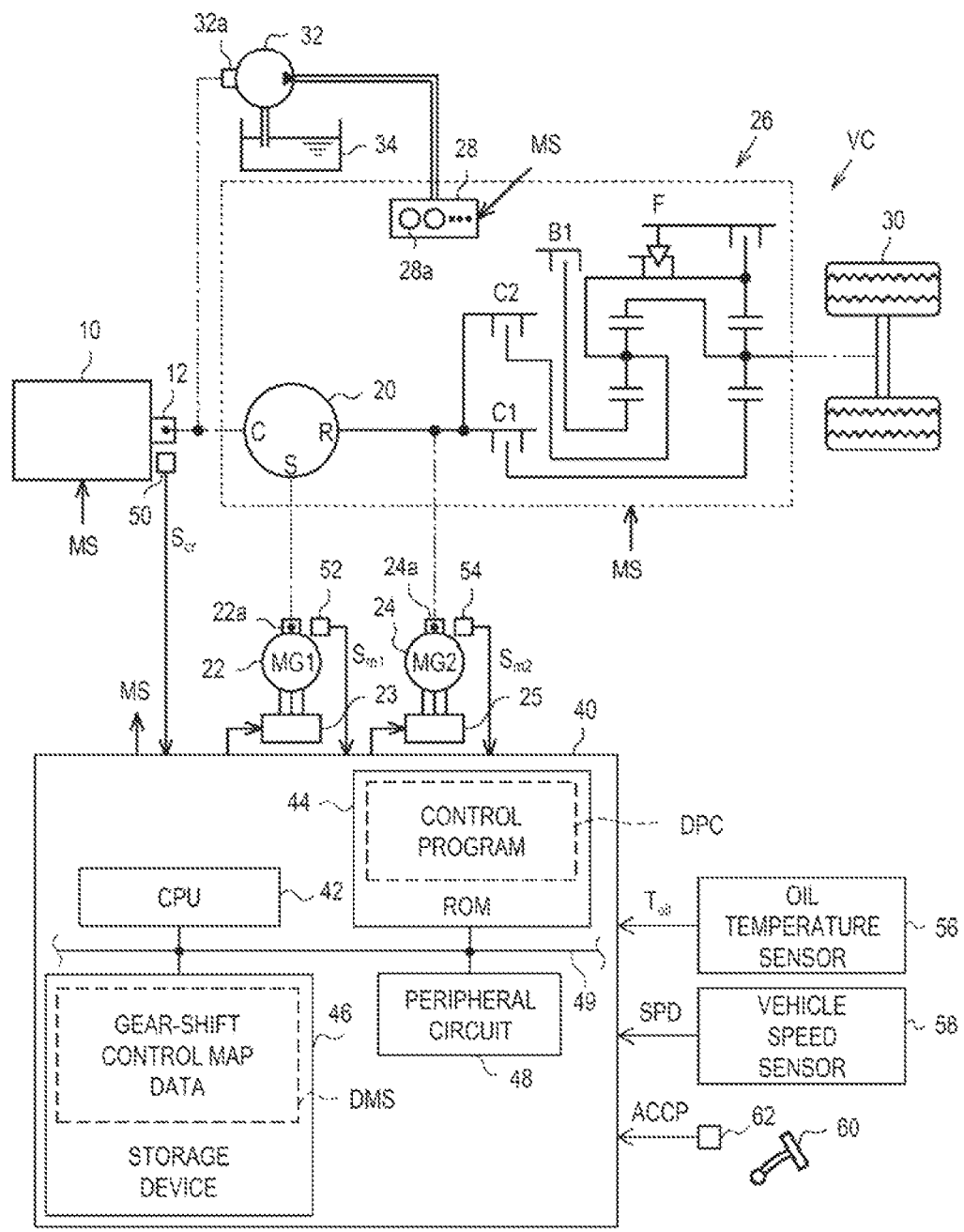
FIG. 1 is a diagram illustrating a control device and a drive system of a vehicle according to a first embodiment.

Hereinafter, a first embodiment will be described with reference to drawings. As illustrated in FIG. 1, a power split device 20 is mechanically connected to a crankshaft 12 of an internal combustion engine 10. The power split device 20 splits power of the internal combustion engine 10, a first motor generator 22, and a second motor generator 24. The power split device 20 includes a planetary gear mechanism. The crankshaft 12 is mechanically connected to a carrier C of the planetary gear mechanism, a rotation shaft 22a of the first motor generator 22 is mechanically connected to a sun gear S thereof, and a rotation shaft 24a of the second motor generator 24 is mechanically connected to a ring gear R thereof. An output voltage of a first inverter 23 is applied to terminals of the first motor generator 22. Further, an output voltage of a second inverter 25 is applied to terminals of the second motor generator 24.

In addition to the rotation shaft 24a of the second motor generator 24, driving wheels 30 are mechanically connected to the ring gear R of the power split device 20 via a transmission 26. Further, a driven shaft 32a of an oil pump 32 is mechanically connected to the carrier C. The oil pump 32 takes in oil in an oil pan 34 and discharges it as hydraulic oil to the transmission 26. The hydraulic oil discharged from the oil pump 32 is used by adjusting the pressure by a hydraulic control circuit 28 in the transmission 26. The hydraulic control circuit 28 includes a plurality of solenoid valves 28a and controls a flow state or the oil pressure of the hydraulic oil by energizing each of the solenoid valves 28a. When the pressure of the hydraulic oil is controlled, a friction engaging element, such as clutches C1, C2 or a brake B1, is switched from one of two states of an engaged state and a released state to the other.

The control device 40 has the internal combustion engine 10 as a control target and operates various operation units of the internal combustion engine 10 in order to control torque, an exhaust component ratio, or the like, which is a control amount thereof. Further, the control device 40 has the first motor generator 22 as a control target and operates the first inverter 23 in order to control torque, rotation speed, or the like, which is a control amount thereof. Further, the control device 40 has the second motor generator 24 as a control target and operates the second inverter 25 in order to control torque, rotation speed, or the like, which is a control amount thereof.

When controlling the control amount, the control device 40 refers to an output signal $S_{cr}$ of a crank angle sensor 50, and an output signal $S_{m1}$ of a first rotation angle sensor 52 that detects a rotation angle of the rotation shaft 22a of the first motor generator 22, or an output signal $S_{m2}$ of a second rotation angle sensor 54 that detects a rotation angle of the rotation shaft 24a of the second motor generator 24. Further, the control device 40 refers to an oil temperature $T_{oil}$, which is the temperature of oil detected by an oil temperature sensor 56, a vehicle speed SPD detected by a vehicle speed sensor 58, or an accelerator operation amount ACCP, which is a depression amount of an accelerator pedal 62 detected by an accelerator sensor 60.

The control device 40 includes a CPU 42, a ROM 44, a storage device 46 that is an electrically rewritable non-volatile memory, and a peripheral circuit 48. They can communicate with each other via a local network 49. Here, examples of the peripheral circuit 48 include a circuit that generates a clock signal regulating an internal operation, a power supply circuit, or a reset circuit. The control device 40 controls the control amount when the CPU 42 executes a program stored in the ROM 44.

Figure 2:
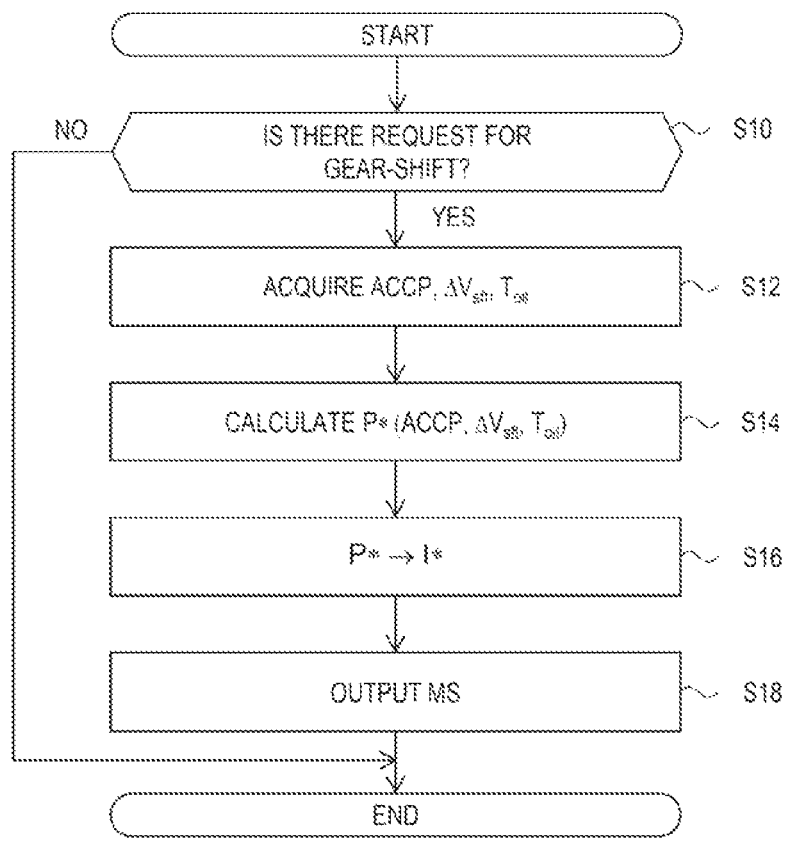
FIG. 2 is a flowchart illustrating a procedure of processing executed by the control device according to the first embodiment.

FIG. 2 illustrates a procedure of processing executed by the control device 40. The processing illustrated in FIG. 2 is implemented when the CPU 42 repeatedly executes a control program DPC stored in the ROM 44 at, for example, a predetermined cycle. Hereinbelow, a step number of each process is represented by a number prefixed with "S".

In a series of processes illustrated in FIG. 2, the CPU 42 first determines whether it is a gear ratio switching period, that is, whether it is a gear-shift period (S10). Then, upon determining that it is the gear-shift period (S10: YES), the CPU 42 acquires the accelerator operation amount ACCP, a switching variable $\Delta V_{sft}$, and the oil temperature $T_{oil}$ (S12). Here, the switching variable $\Delta V_{sft}$ specifies the gear ratios before and after switching, for example, whether the gear is being shifted from first gear to second gear, or from second gear to first gear. In other words, it is a variable that specifies the type of gear-shift.

Next, the CPU 42 map-calculates an oil pressure command value P* using a gear-shift control map data DMS that is stored in the storage device 46 illustrated in FIG. 1 (S14). The gear-shift control map data DMS has the accelerator operation amount ACCP, the switching variable $\Delta V_{sft}$, and the oil temperature $T_{oil}$ as input variables and the oil pressure command value P* as an output variable. The map data is a set of data of discrete values of input variables and values of output variables respectively corresponding to the values of the input variables. Further, in the map calculation, for example, when a value of an input variable matches any of the values of the input variables of the map data, the value of the corresponding output variable of the map data is used as a calculation result whereas when a value of an input variable does not match any of the values of the input variables of the map data, a value obtained by interpolating values of a plurality of output variables included in the map data is used as the calculation result.

Here, the oil pressure command value P* is a command value of an oil pressure adjusted by a solenoid valve 28a that drives the friction engaging element, which is switched from the released state to the engaged state by switching the gear ratio, from among the solenoid valves 28a. More specifically, in the present embodiment, the oil pressure command value P* is set for each phase illustrated in FIG. 3. Here, Phase 1 is a period from the start of a switching control of the gear ratio until a predetermined time passes. Phase 2 is a period from the end of Phase 1 to the end of a torque phase. In other words, it is the period until torque transmissibility of the friction engaging element, which is switched from the engaged state to the released state by switching the gear ratio, becomes zero. The CPU 42 determines an end point of Phase 2 based on a difference between an actual rotation speed of the input shaft and a rotation speed of the input shaft determined by the rotation speed of the output shaft of the transmission 26 and the gear ratio at the start of the gear-shift period. The actual rotation speed of the input shaft is a rotation speed $N_{m2}$. Further, the CPU 42 calculates the rotation speed of the output shaft according to the vehicle speed SPD. Phase 3 is a period from the end of Phase 2 to a point at which the gear-shift is completed. The CPU 42 calculates the rotation speed $N_{m2}$ based on the output signal $S_{m2}$.

Figures 3, 4:
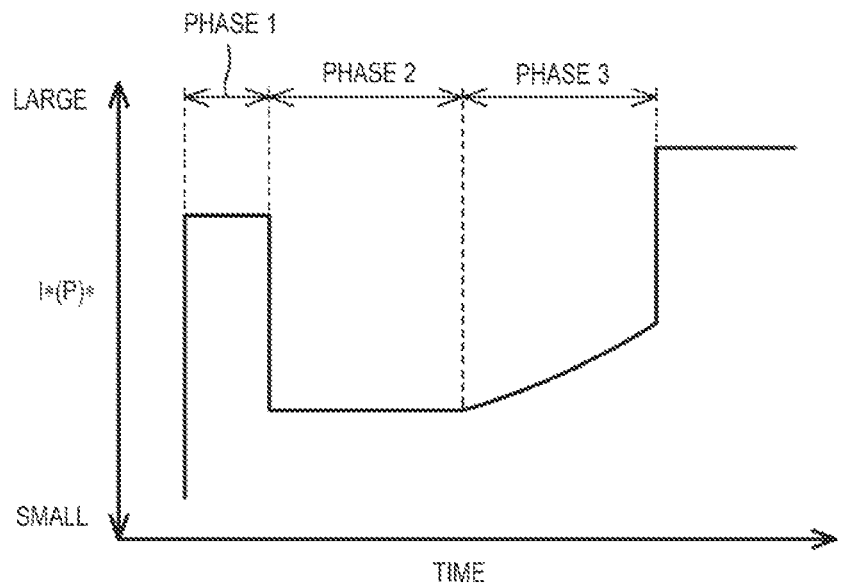
FIG. 3 is a time chart exemplifying each phase of a gear-shift period according to the first embodiment.
FIG. 4 is a diagram exemplifying map data of an oil pressure command value according to the first embodiment.

FIG. 4 illustrates the gear-shift control map data DMS. As illustrated in FIG. 4, the gear-shift control map data DMS is data in which a value of the oil pressure command value P* is set for each accelerator operation amount ACCP, the type of gear-shift, and the oil temperature $T_{oil}$. For the accelerator operation amount ACCP or the oil temperature $T_{oil}$, the median values of the regions divided in FIG. 4 are used as the values of the input variables of the gear-shift control map data DMS. FIG. 4 exemplifies a value A1 of the output variable for switching from first gear to second gear when the accelerator operation amount ACCP is 5%. The data illustrated in FIG. 4 is actually provided separately in each of Phase 1, Phase 2, and Phase 3.

Returning to FIG. 2, the CPU 42 converts the oil pressure command value P* into a current command value I* of the corresponding solenoid valve 28a (S16). Then, the CPU 42 operates the solenoid valve 28a by outputting an operation signal MS to the solenoid valve 28a (S18).

Figure 5:
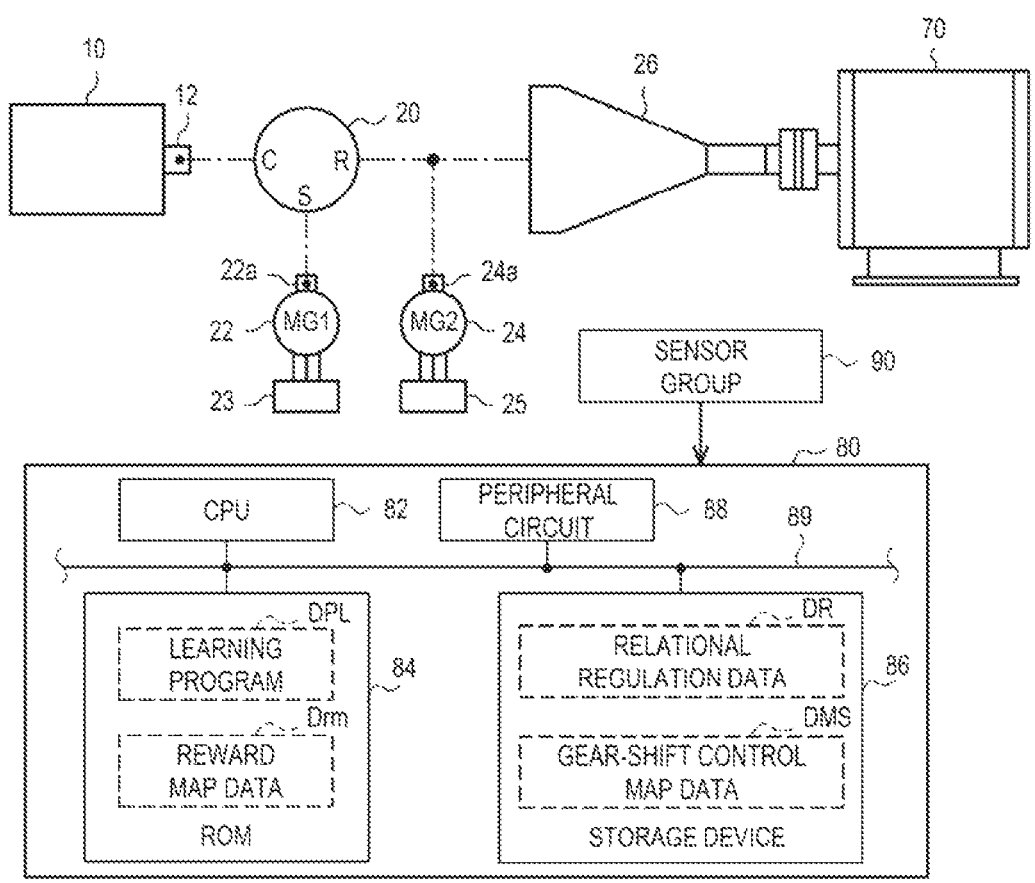
FIG. 5 is a diagram illustrating a system that generates the map data according to the first embodiment.

Upon ending the process of S18 or making a negative determination in the process of S10, the CPU 42 temporarily ends a series of processes illustrated in FIG. 2. FIG. 5 illustrates a configuration of a system that generates the gear-shift control map data DMS.

As illustrated in FIG. 5, in the present embodiment, a dynamometer 70 can be mechanically connected to the ring gear R of the power split device 20 and the rotation shaft 24a of the second motor generator 24 via the transmission 26. Then, various state variables when the internal combustion engine 10, the first motor generator 22, or the second motor generator 24 is operated are detected by a sensor group 90, and detection results are input to a generator 80 that is a computer that generates the gear-shift control map data DMS. The sensor group 90 includes a sensor mounted on a vehicle VC illustrated in FIG. 1.

The generator 80 includes a CPU 82, a ROM 84, an electrically rewritable non-volatile memory (a storage device 86), and a peripheral circuit 88. They can communicate with each other via a local network 89.

Figure 6:
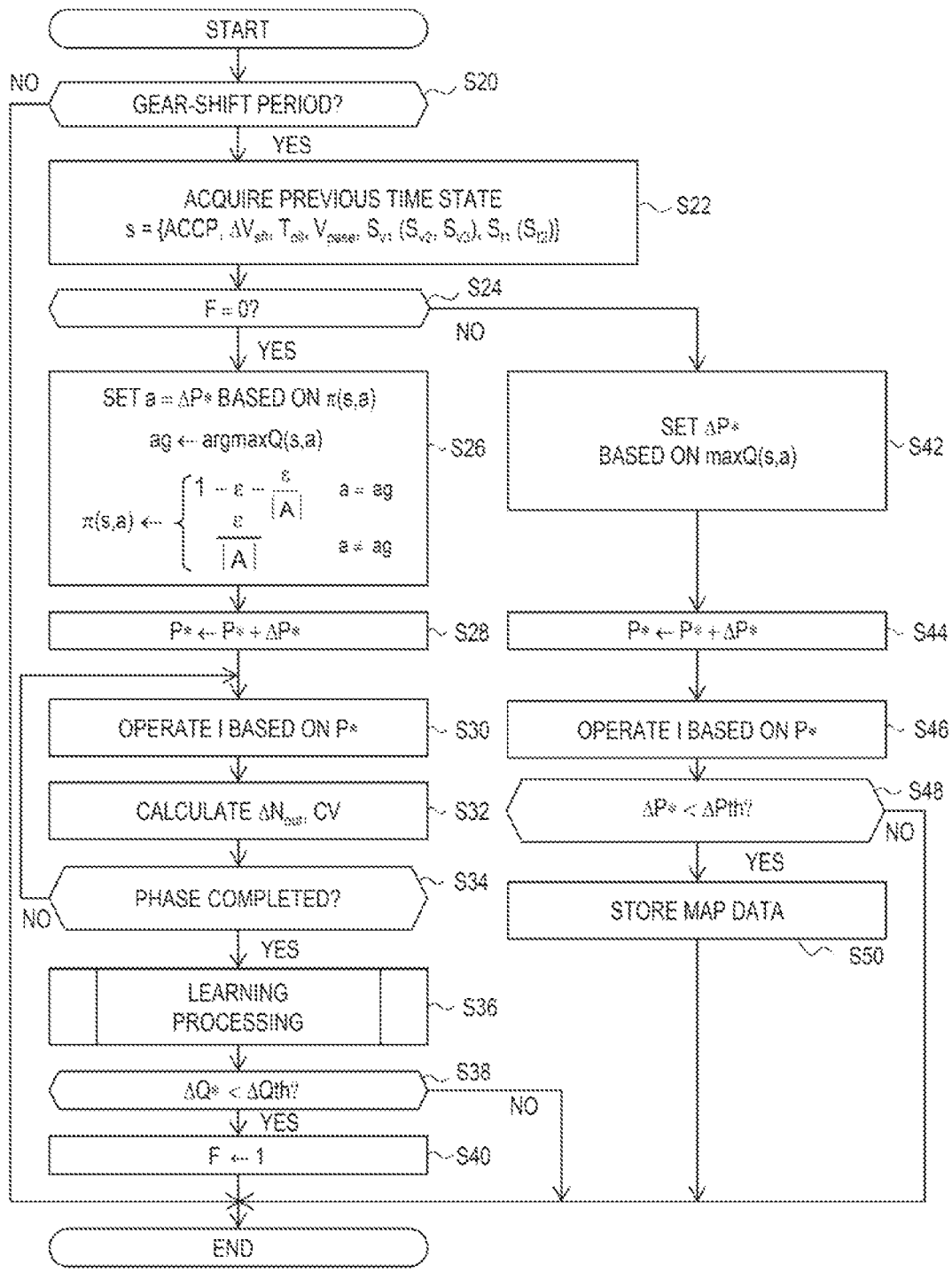
FIG. 6 is a flowchart illustrating a procedure of processing for generating the map data according to the first embodiment.

FIG. 6 illustrates a procedure of processing executed by the generator 80. The processing illustrated in FIG. 6 is implemented when the CPU 82 executes a learning program DPL stored in the ROM 84. In a series of processes illustrated in FIG. 6, the CPU 82 first determines whether it is a gear-shift period (S20). Upon determining that it is the gear-shift period (S20: YES), the CPU 82 acquires, as a state s, the accelerator operation amount ACCP, the switching variable $\Delta V_{sft}$, the oil temperature $T_{oil}$, a phase variable $V_{pase}$, a first deviation variable $S_{v1}$ ($S_{v2}$, $S_{v3}$), and a second deviation variable $S_{t1}$ ($S_{t2}$) (S22).

Figure 7:
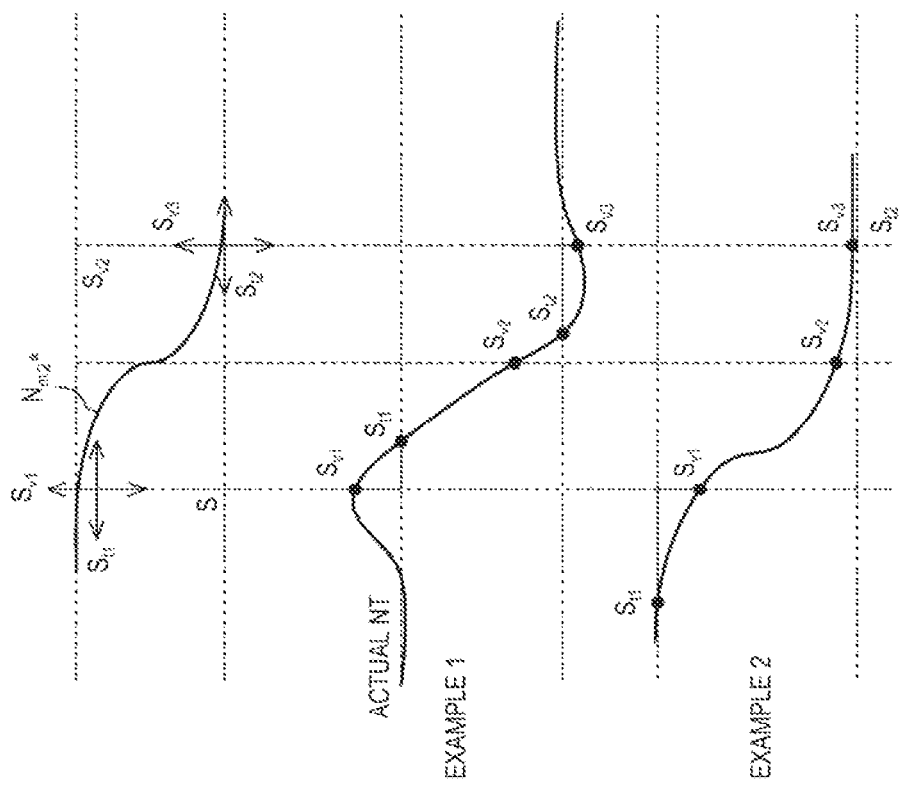
FIG. 7 is a diagram illustrating a definition of an action variable according to the first embodiment.

FIG. 7 illustrates the first deviation variables $S_{v1}$, $S_{v2}$, $S_{v3}$ and the second deviation variables $S_{t1}$, $S_{t2}$. As illustrated in FIG. 7, in the present embodiment, a rotation speed $N_{m2*}$ is determined as a reference for a rotation speed of the input shaft of the transmission 26. The rotation speed $N_{m2*}$ as the reference is variable depending on the accelerator operation amount ACCP, the switching variable $\Delta V_{sft}$, and the oil temperature $T_{oil}$.

The first deviation variable $S_{v1}$ illustrates a difference amount between the rotation speed $N_{m2*}$ as the reference at a first timing, which is a predetermined timing at an initial stage of the gear-shift, and an actual rotation speed $N_{m2}$. Further, the second deviation variable $S_{t1}$ illustrates a difference amount between a timing, at which the actual rotation speed $N_{m2*}$ reaches the rotation speed $N_{m2*}$ as the reference at the first timing, and the first timing.

Further, the first deviation variable $S_{v2}$ illustrates a difference amount between the rotation speed $N_{m2*}$ as the reference at a second timing, which is a predetermined timing at an intermediate stage of the gear-shift, and the actual rotation speed $N_{m2}$. Further, the first deviation variable $S_{v3}$ illustrates a difference amount between the rotation speed $N_{m2*}$ as the reference at a third timing, which is a predetermined timing at a final stage of the gear-shift, and the actual rotation speed $N_{m2}$. Further, the second deviation variable $S_{t2}$ illustrates a difference amount between a timing, at which the actual rotation speed $N_{m2*}$ reaches the rotation speed $N_{m2*}$ as the reference at the third timing, and the third timing.

At the start of Phase 1, in the process of S22, the CPU 82 acquires the first deviation variable $S_{v1}$ and the second deviation variable $S_{t1}$ in the most recent past in which the accelerator operation amount ACCP, the switching variable $\Delta V_{sft}$, and the oil temperature $T_{oil}$ match in the regions divided by the gear-shift control map data DMS in FIG. 4. Further, at the start of Phase 2, in the process of S22, the CPU 82 acquires the first deviation variable $S_{v2}$ in the most recent past in which the accelerator operation amount ACCP, the switching variable $\Delta V_{sft}$, and the oil temperature $T_{oil}$ match in the regions divided by the gear-shift control map data DMS in FIG. 4. Further, at the start of Phase 3, in the process of S22, the CPU 82 acquires the first deviation variable $S_{v3}$ and the second deviation variable $S_{t2}$ in the most recent past in which the accelerator operation amount ACCP, the switching variable $\Delta V_{sft}$, and the oil temperature $T_{oil}$ match in the regions divided by the gear-shift control map data DMS in FIG. 4.

In the system illustrated in FIG. 5, the accelerator pedal 62 does not exist. For this reason, it is assumed that the accelerator operation amount ACCP is virtually generated when the generator 80 simulates the state of the vehicle VC, and the virtually generated accelerator operation amount ACCP is regarded as a state of the vehicle based on the detection value of the sensor. Further, the vehicle speed SPD is calculated by the CPU 82 as a traveling speed of the vehicle under the assumption that the vehicle actually exists.

In the present embodiment, the vehicle speed is regarded as the state of the vehicle based on the detection value of the sensor. More specifically, the CPU 82 calculates the vehicle speed SPD based on a rotation speed of the dynamometer 70.

The state s is a value of a variable of which the relationship with the action variable is regulated by the relational regulation data DR stored in the storage device 86 illustrated in FIG. 5. Here, in the present embodiment, as the action variable, a correction amount $\Delta P^*$ of the oil pressure command value $P^*$ as the output variable of the gear-shift control map data DMS illustrated in FIG. 4 is exemplified. The action variable of Phase 3 actually included in the relational regulation data DR may be a correction amount of a pressure rise rate.

Specifically, the relational regulation data DR includes an action value function Q. The action value function Q has the state s and an action a as independent variables and an expected profit for the state s and the action a as a dependent variable. In the present embodiment, the action value function Q is a table-type function. In particular, in the present embodiment, the state s as the independent variable of the action value function Q has a certain width shown by the divided region illustrated in FIG. 4. In other words, for example, as can be seen from the width setting illustrated in FIG. 4, a case where the accelerator operation amount ACCP is "3%" and a case where the accelerator operation amount is "6%" do not become different states s from each other only based on the fact that the cases have different values.

Next, the CPU 82 determines whether a value of a flag F is "0" (S24). When the value of the flag F is "0", it indicates that a search in the reinforcement learning is permitted and when the value of the flag F is "1", it indicates that the search is not permitted.

Upon determining that the value of the flag F is "0" (S24: YES), the CPU 82 calculates the value of the action variable based on a policy $\pi$ regulated by the relational regulation data DR (S26). In the present embodiment, an $\varepsilon$-greedy policy is exemplified as the policy. In other words, a policy is exemplified in which when the state s is granted, a rule for preferentially selecting an action that maximizes the action value function Q (hereinafter referred to as a greedy action ag) from among the action value functions Q in which the independent variable becomes the given state s while selecting the other actions with a predetermined probability is determined. Specifically, when the total number of values that can be taken by an action is expressed by "|A|", probabilities of taking actions other than the greedy action are expressed by "$\varepsilon/|A|$", respectively.

Next, the CPU 82 corrects the oil pressure command value $P^*$ of the gear-shift control map data DMS stored in the storage device 86 by the correction amount $\Delta P^*$ as the value of the action variable selected in the process of S26 (S28). Then, the CPU 82 operates an energizing current I of the solenoid valve 28a such that the energizing current I becomes a value that is determined based on the oil pressure command value $P^*$ corrected by the process of S28 (S30).

Then, the CPU 82 calculates an output shaft fluctuation amount $\Delta N_{out}$, which is a difference between the maximum value and the minimum value per unit time of the rotation speed of the output shaft of the transmission 26, and the heat generation amount CV (S32). Here, the output shaft fluctuation amount $\Delta N_{out}$ is a variable that quantifies an impact generated in the vehicle VC when switching the gear ratio. The CPU 82 calculates the rotation speed of the output shaft according to the vehicle speed SPD.

On the other hand, in the present embodiment, the heat generation amount CV is calculated as an amount proportional to the product of rotational speed difference between a pair of the friction engaging elements and the torque applied to them when switching from one of the two states of the released state and the fastened state to the other. More specifically, the CPU 42 calculates the heat generation amount CV based on the rotation speed $N_{m2}$ as the rotation speed of the input shaft of the transmission 26, the rotation speed of the output shaft of the transmission 26 grasped from the vehicle speed SPD, and the torque grasped from the accelerator operation amount ACCP. Specifically, the CPU 42 map-calculates the heat generation amount CV in a state where the map data that has the rotation speed of the input shaft, the rotation speed of the output shaft, and the accelerator operation amount ACCP as the input variables and the heat generation amount CV as the output variable is stored in advance in the ROM 44.

The CPU 82 executes the processes of S30 and S32 until the current phase is completed (S34: NO). Then, upon determining that the current phase is completed (S34: YES), the CPU 82 updates the relational regulation data DR by the reinforcement learning (S36).

Figure 8:
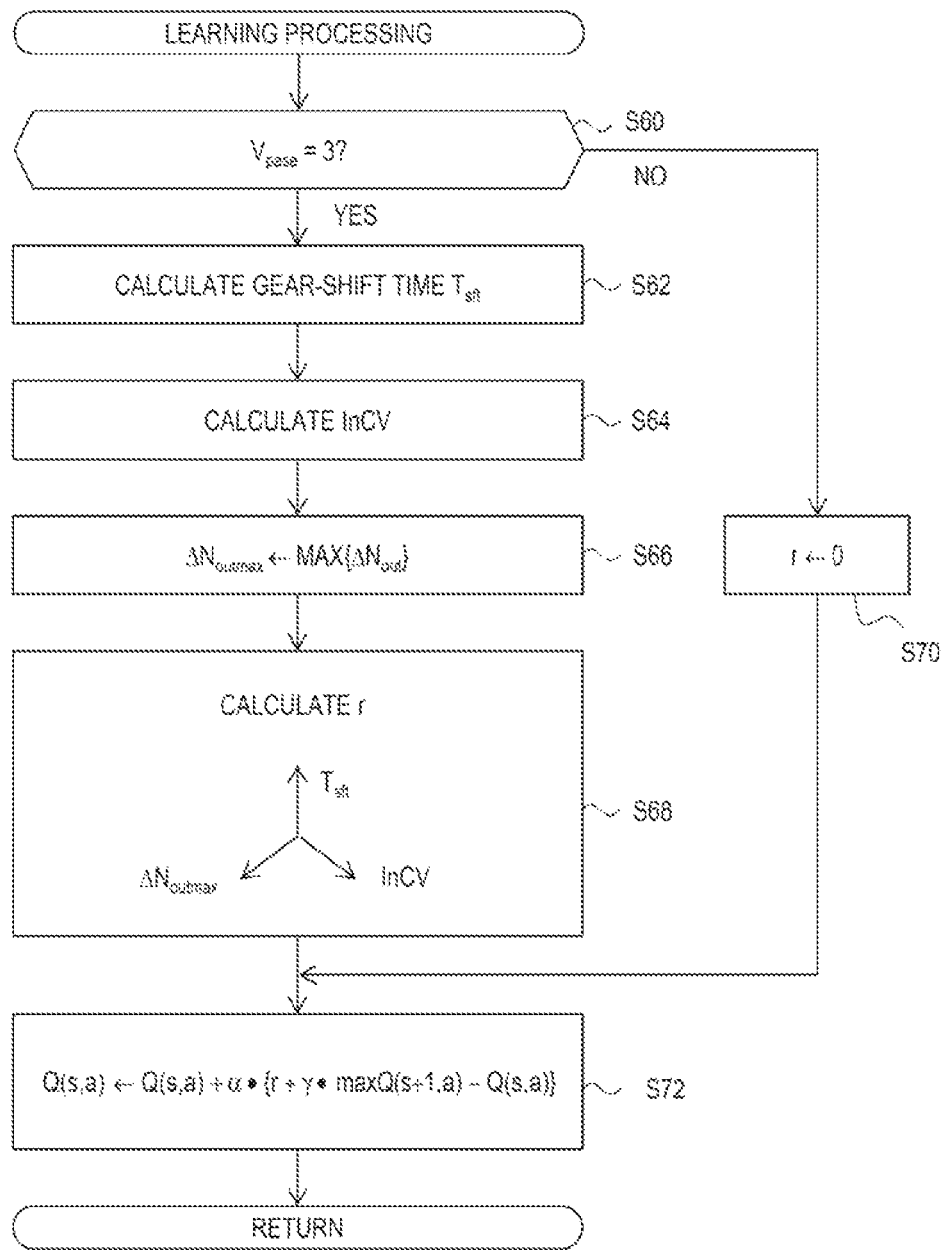
FIG. 8 is a flowchart illustrating a detailed procedure of learning processing according to the first embodiment.

FIG. 8 illustrates details of the process of S36. In a series of processes illustrated in FIG. 8, the CPU 82 first determines whether the phase variable $V_{pase}$ is "3" (S60). Then, upon determining that the variable is "3" (S60: YES), since the gear-shift has been completed, the CPU 82 calculates the gear-shift time $T_{sft}$, which is the time required for the gear-shift (S62). Further, the CPU 82 calculates a heat generation amount InCV, which is an integrated value of the heat generation amount CV calculated in the process of S32 during a period from the start to the end of one phase (S64). Further, the CPU 82 calculates a maximum output shaft fluctuation value $\Delta N_{outmax}$, which is a maximum value of the output shaft fluctuation amount $\Delta N_{out}$ calculated in the process of S32 during the period from the start to the end of one phase (S66).

Then, the CPU 82 calculates a reward r according to the gear-shift time $T_{sft}$, the heat generation amount InCV, and the maximum output shaft fluctuation value $\Delta N_{outmax}$ (S68). More specifically, the CPU 82 calculates the reward r to be a value higher when the gear-shift time $T_{sft}$ is short than when it is long. Further, the CPU 82 calculates the reward r to be a value higher when the heat generation amount InCV is small than when it is large. In addition, the CPU 82 calculates the reward r to be a value higher when maximum output shaft fluctuation value $\Delta N_{outmax}$ is small than when it is large.

Specifically, the CPU 82 map-calculates the reward r in a state where the reward map data $D_{rm}$ that has the gear-shift time $T_{sft}$, the heat generation amount InCV, and the maximum output shaft fluctuation value $\Delta N_{outmax}$ as input variables and the reward r as the output variable is stored in the storage device 86 illustrated in FIG. 5. Here, the reward map data $D_{rm}$ sets the reward r so as to be able to satisfy, in a well-balanced manner, the required element for the gear-shift time $T_{sft}$, the required element for the heat generation amount InCV, or the required element for the impact amount at the time of the gear-shift. For example, even when the maximum output shaft fluctuation value $\Delta N_{outmax}$ and the heat generation amount InCV are small, in a case where the gear-shift time $T_{sft}$ is excessively long, the value of the reward r is set to be small. In other words, the reward map data $D_{rm}$ sets the criterion for assigning the high reward to a state where each required element is satisfied to a certain extent, not to a state where some required elements are satisfied at an excessively low level but a specific required element is sufficiently satisfied. This setting aims to prevent the learning from being executed in a manner that sufficiently satisfies other required elements by ignoring some required elements.

On the other hand, upon determining whether the phase variable $V_{pase}$ is "1" or "2" (S60: NO), the CPU 82 enters "0" into the reward r (S70). When the processes of S68 and S70 are completed, the CPU 82 updates, based on the reward r, the action value function Q(s,a) used in the process of S26 (S72). The action value function Q(s,a) used in the process of S26 is an action value function Q(s,a) that has the state s acquired by the process of S22 and the action a set by the process of S26 as independent variables.

In the present embodiment, the action value function Q(s,a) is updated by so-called Q-learning, which is a policy-off type TD method. Specifically, the action value function Q(s,a) is updated by the following equation (c1):

$$Q(s,a) \leftarrow Q + \alpha \cdot \{r + \gamma \cdot \max Q(s+1,a) - Q(s,a)\} \quad \ldots \text{(c1)}$$

Here, a discount rate γ and a learning rate a are used in an update amount "α·{r+γ·maxQ(s+1, a)−Q(s,a)}" of the action value function Q (s,a). Both the discount rate γ and the learning rate a are constants greater than "0" and equal to or less than "1". Further, when the current phase is Phase 1 or Phase 2, "maxQ(s+1, a)" means the action value function having the maximum value from among the action value functions Q that have a state variable at the time of completion of the phase, that is, a state s+1 to be acquired by a process of S22 after the series of processes illustrated in FIG. 6 as an independent variable. Unless the current phase is Phase 3, the state s acquired by the process of S22 after the series of processes illustrated in FIG. 6 is the state s+1 used by the process of S72. On the other hand, when the current phase is Phase 3, "maxQ(s+1, a)" is the action value function actually selected in the process of S26.

When the process of S72 is completed, the CPU 82 completes the process of S36 of FIG. 6. Returning to FIG. 6, the CPU 82 determines whether a state where a change amount ΔQ of the action value function Q is smaller than a threshold value $ΔQ_{th}$ continues for a predetermined period (S38). This process is a process for determining whether the reinforcement learning has converged. Upon determining that the reinforcement learning has converged (S38: YES), the CPU 82 enters "1" into the flag F (S40).

On the other hand, upon determining that the value of the flag F is "1" (S24: NO), the CPU 82 sets the action a, represented by the action value function having the maximum value from among the action value functions Q in which a state that is the independent variable matches the state s acquired in the process of S22, as a correction amount ΔP* (S42). Then, the CPU 82 executes the processes of S44 and S46 corresponding to the processes of S28 and S30, and determines whether the state where the correction amount ΔP* set in the process of S42 is smaller than a defined value $ΔP_{th}$ continues for a predetermined period (S48). This process is a process for determining whether the gear-shift control map data DMS corrected by the correction amount ΔP* has converged. Upon making a positive determination in the process of S48 (S48: YES), the CPU 82 stores the gear-shift control map data DMS at that time in the storage device 86 as map data to be mounted on the vehicle VC (S50).

Upon completing the processes of S40 and S50 or making a negative determination in the processes of S20, S38, and S48, the CPU 82 temporarily ends the series of processes illustrated in FIG. 6. Here, an action and an advantageous effect of the present embodiment will be described.

During the gear-shift period, the CPU 82 selects the greedy action ag, operates the energizing current of the solenoid valve 28a, and searches for a better oil pressure command value P* using an action other than the greedy action with a predetermined probability. Then, the CPU 82 updates the action value function Q used for determining the oil pressure command value P* by the Q-learning.

Here, when assigning the reward r used in the Q-learning according to the gear-shift time $T_{sft}$, the heat generation amount InCV, and the maximum output shaft fluctuation value $ΔN_{outmax}$, the CPU 82 sets a criterion for assigning a predetermined reward for the combination of the gear-shift time $T_{sft}$, the heat generation amount InCV, and the maximum output shaft fluctuation value $ΔN_{outmax}$. As a result, it is possible to learn, by the reinforcement learning, the oil pressure command value P* that satisfies, in a well-balanced manner, the three required elements of the gear-shift time $T_{sft}$, the heat generation amount InCV, and the impact amount due to the gear-shift.

With the above-described present embodiment, an advantageous effect to be described below can be further obtained.

(1) The reward r has been map-calculated using the reward map data $D_{rm}$. As a result, it is possible to easily increase the degree of freedom in setting the relationship between the gear-shift time $T_{sft}$, the heat generation amount InCV, and the impact amount due to the gear-shift, and the reward r.

(2) The action value function Q has been set for each phase into which the gear-shift period had been divided according to physical phenomena. As a result, in learning an appropriate value of the action variable, since the labor of learning for identifying the section due to the variations in physical phenomena is saved, it is possible to find the value of the action variable that increases an actual profit at an early stage by the reinforcement learning.

(3) By including the accelerator operation amount ACCP, the switching variable $ΔV_{sft}$, and the oil temperature $T_{oil}$ in the variable representing the state of the vehicle of which the relationship with the value of the action variable is regulated by the relational regulation data DR, it is possible to smoothly proceed with the learning as compared to a case where they are not included in the variable. In other words, an appropriate value of the action variable for satisfying each of the required elements in a predetermined criterion may vary depending on the value of the accelerator operation amount, the type of gear-shift, or the temperature of the hydraulic oil. For this reason, when a value of a common action variable is determined for different combinations of the accelerator operation amount, the type of gear-shift, and the temperature of the hydraulic oil, it may be difficult to satisfy the required elements. In other words, it may be difficult to smoothly proceed with the learning.

(4) The gear-shift control map data DMS, which receives, as an input, the state of the vehicle by associating the state of the vehicle with the value of the action variable that maximizes the expected profit based on the relational regulation data DR and outputs the oil pressure command value P* that maximizes the expected profit, has been generated. By mounting the gear-shift control map data DMS on the control device 40, it is possible to easily set the oil pressure command value P* that maximizes the expected profit.

(5) The first deviation variable $S_{v1}$ ($S_{v2}$, $S_{v3}$) and the second deviation variable $S_{r1}$ ($S_{r2}$) have been included in the state s, and the action variable was the correction amount ΔP*. As a result, it is easy for an expert to evaluate a result of the reinforcement learning. In other words, when the expert adjusts the oil pressure command value P*, a work of setting a correction amount of the oil pressure command value to a reasonable value determined from experience is repeated according to a difference from an ideal rotation speed. On the other hand, with the reinforcement learning according to the present embodiment, it is possible to grasp, by the action value function Q, what correction amount ΔP* is the greedy action for the difference from the rotation speed $N_{m2*}$ as the reference. For this reason, it is possible to evaluate, from the viewpoint of an expert, whether the correction amount ΔP*, which is the greedy action, is a reasonable value.

Second Embodiment

Hereinafter, a second embodiment will be described with reference to drawings, focusing on differences from the first embodiment.

Figure 9:
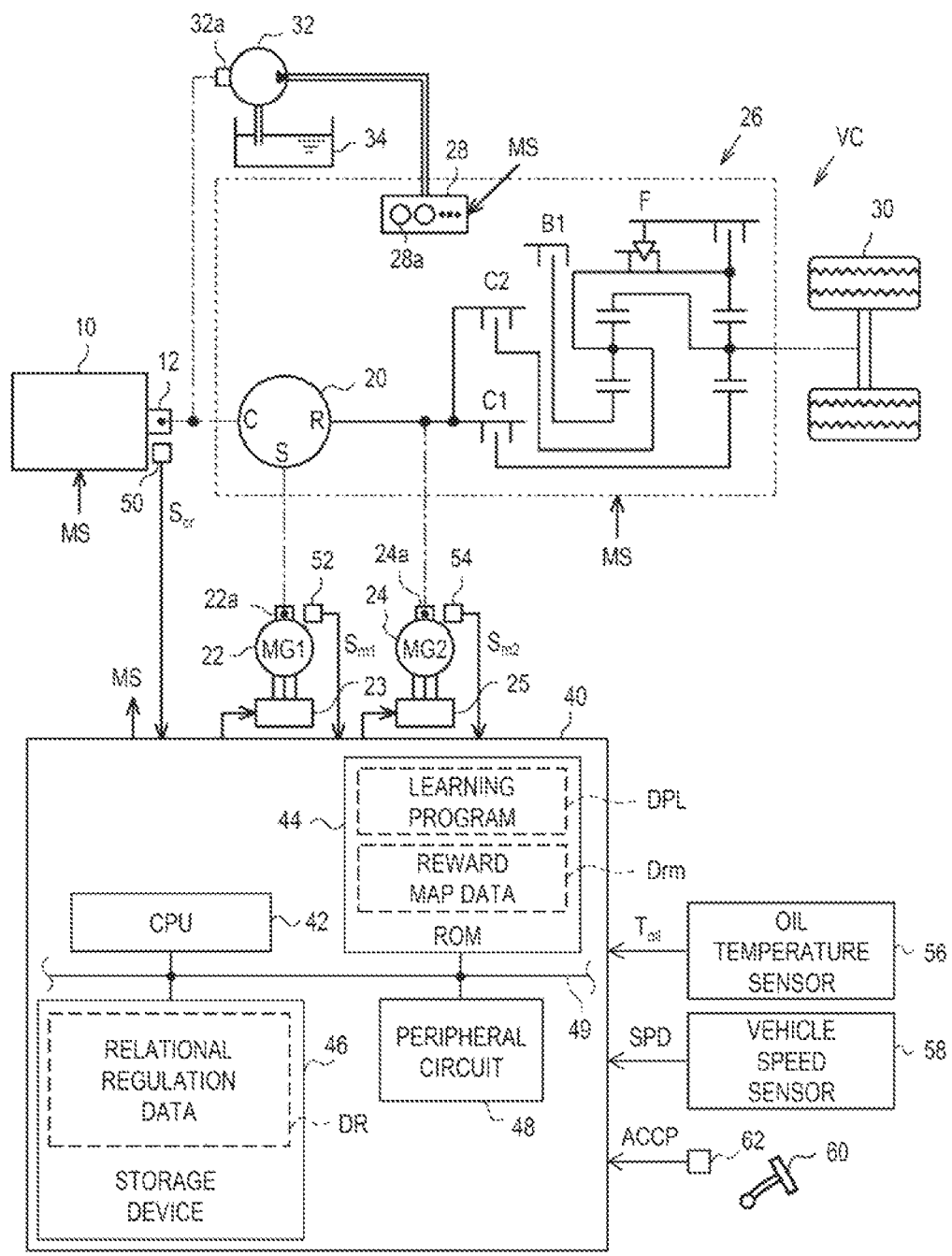
FIG. 9 is a diagram illustrating a control device and a drive system of a vehicle according to a second embodiment.

FIG. 9 illustrates a drive system and a control device of the vehicle VC according to the present embodiment. In FIG. 9, parts corresponding to those of FIG. 1 are denoted by the same reference signs for convenience. As illustrated in FIG. 9, in the present embodiment, the ROM 44 stores the learning program DPL and the reward map data $D_{rm}$. Further, the storage device 46 does not store the gear-shift control map data DMS, but instead stores the relational regulation data DR.

Figure 10:
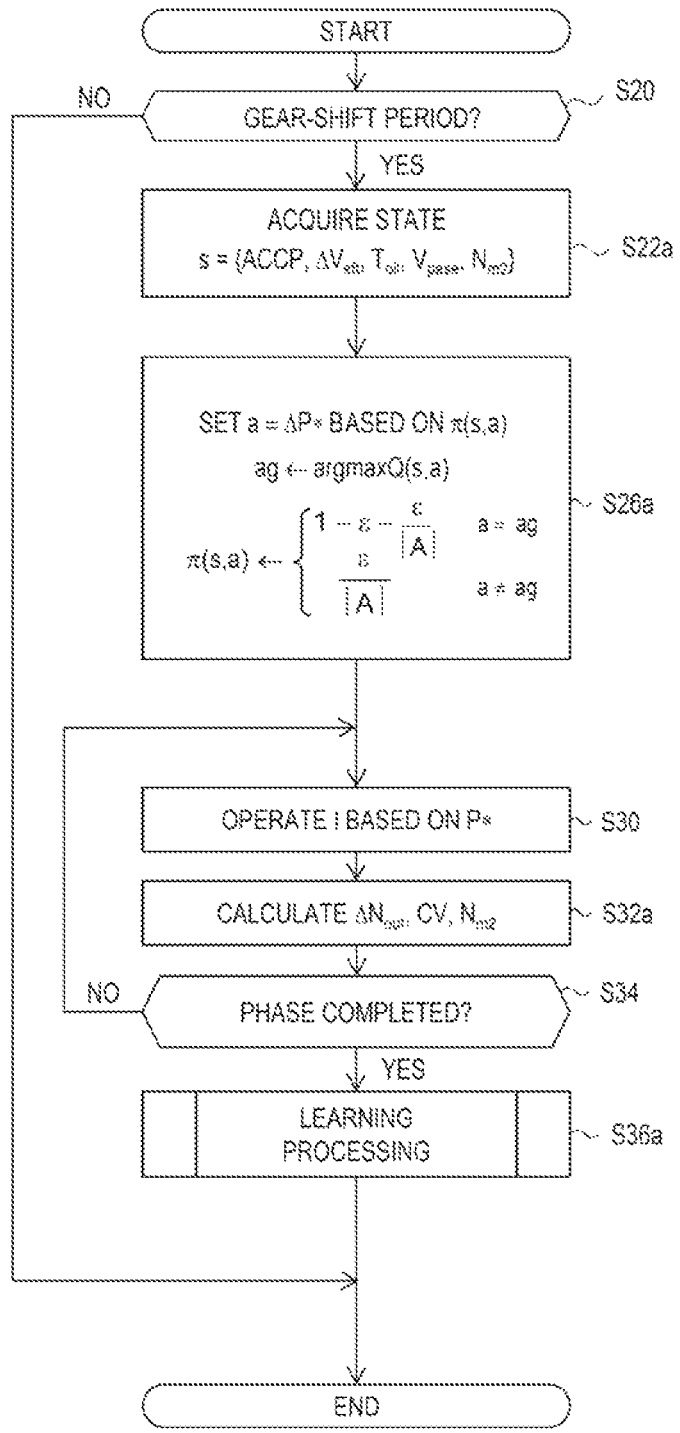
FIG. 10 is a flowchart illustrating a procedure of processing executed by the control device according to the second embodiment.

FIG. 10 illustrates a procedure of processing executed by the control device 40 according to the present embodiment. The processing illustrated in FIG. 10 is implemented when the CPU 42 repeatedly executes the learning program DPL stored in the ROM 44 at, for example, a predetermined cycle. In FIG. 10, for processes corresponding to those illustrated in FIG. 6, the same step numbers are assigned for convenience.

In the series of processes of FIG. 10, upon making a positive determination in the process of S20, the CPU 42 acquires the accelerator operation amount ACCP, the switching variable $ΔV_{sft}$, the oil temperature $T_{oil}$, the phase variable $V_{pase}$, and a rotation speed $N_{m2}$ of the second motor generator 24 as the state s regulated by the relational regulation data DR illustrated in FIG. 9 (S22a). Next, the CPU 42 calculates the value of the action variable based on the policy π regulated by the relational regulation data DR (S26a). The action variable in the present embodiment is the oil pressure command value P* itself.

Then, after executing the process of S30, the CPU 42 calculates a blow amount $ΔN_{m2}$ in addition to the output shaft fluctuation amount $ΔN_{out}$ and the heat generation amount CV (S32a). The blow amount $ΔN_{m2}$ is a quantified amount of blow-up of the rotation speed of the input shaft of the transmission 26 during the gear-shift period, and is calculated as an amount in which the rotation speed $N_{m2}$ exceeds the above-described rotation speed $N_{m2*}$ as the reference.

Next, upon proceeding to the process of S34 and determining that it is the time of completion of the phase (S34: YES), the CPU 42 updates the relational regulation data DR (S36a). Upon completing the process of S36a or making a negative determination in the process of S20, the CPU 42 temporarily ends the series of processes illustrated in FIG. 10.

Figure 11:
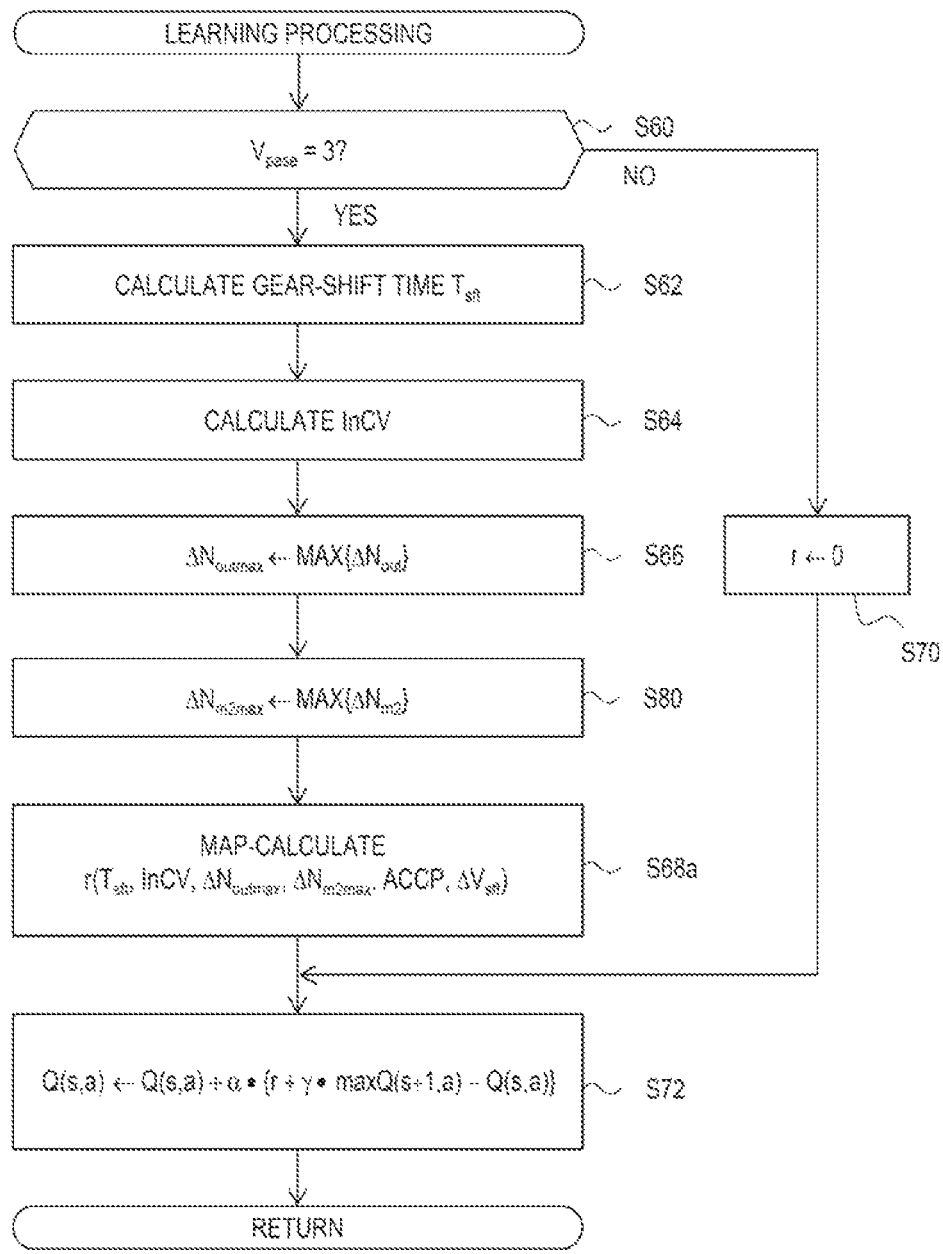
FIG. 11 is a flowchart illustrating a detailed procedure of learning processing according to the second embodiment.

FIG. 11 illustrates a detailed procedure of S36a. In FIG. 11, for the same processes as those illustrated in FIG. 8, the same step numbers are assigned for convenience. In the series of processes illustrated in FIG. 11, upon making a positive determination in the process of S60, the CPU 42 executes a process for entering the maximum value of the blow amount $ΔN_{m2}$ into the maximum blow amount $ΔN_{m2max}$ (S80) in addition to the processes of S62 to S66.

Then, the CPU 42 assigns the reward r for the value of the action variable used by the process of S26a according to the gear-shift time $T_{sft}$, the heat generation amount InCV, the maximum output shaft fluctuation value $ΔN_{outmax}$, and the maximum blow amount $ΔN_{m2max}$ (S68a). More specifically, the CPU 42 map-calculates the reward r using the reward map data $D_{rm}$ that has the gear-shift time $T_{sft}$, the heat generation amount InCV, the maximum output shaft fluctuation value $ΔN_{outmax}$, and the maximum blow amount $ΔN_{m2max}$ as input variables and the reward r as an output variable and is stored in the ROM 44 illustrated in FIG. 9.

The reward map data $D_{rm}$ sets the reward r so as to be able to satisfy, in a well-balanced manner, the required element for the gear-shift time $T_{sft}$, the required element for the heat generation amount InCV, the required element for the impact amount at the time of the gear-shift, and the required element for the amount in which the rotation speed $N_{m2}$ of the input shaft exceeds the rotation speed $N_{m2*}$ as the reference.

In addition, in the present embodiment, even in the combination where the values of the above four variables are the same, the value of the reward r varies depending on the accelerator operation amount ACCP and the switching variable $ΔV_{sft}$. This is implemented by including the accelerator operation amount ACCP and the switching variable $ΔV_{sft}$ in addition to the above four variables in the input variables of the reward map data $D_{rm}$.

Here, the reward r is assigned according to the accelerator operation amount ACCP or the type of gear-shift for the following reasons. First, it is a setting for learning the greedy action ag such that the priorities of the above four required elements vary depending on the accelerator operation amount ACCP and the switching variable $ΔV_{sft}$.

In other words, for example, in a case where the priority of an accelerator response is higher when switching from second gear to first gear than when switching from first gear to second gear, the absolute value of the reward r for the same gear-shift time $T_{sft}$ is set to be larger when switching from second gear to first gear than when switching from first gear to second gear. In that case, by, for example, increasing the priority of the heat generation amount InCV, the absolute value of the reward r for the same heat generation amount InCV is set to be larger when switching from first gear to second gear than when switching from second gear to first gear.

Second, since the torque or the rotation speed applied to the transmission 26 varies depending on the accelerator operation amount ACCP or the type of gear-shift, values of the maximum output shaft fluctuation value $ΔN_{outmax}$, the maximum blow amount $ΔN_{m2max}$, the gear-shift time $T_{sft}$, and the heat generation amount InCV that can be taken vary depending on the accelerator operation amount ACCP and the type of gear-shift. For this reason, when the same reward r is uniformly assigned for the gear-shift time $T_{sft}$ or the like regardless of the accelerator operation amount ACCP or the type of gear-shift, the learning may become difficult.

As described above, in the present embodiment, not only are the accelerator operation amount ACCP and the switching variable $ΔV_{sft}$ included in the state s, but also the reward r is set to be variable depending on the accelerator operation amount ACCP and the switching variable $ΔV_{sft}$. As a result, it is possible to execute the learning reflecting that the priorities of the gear-shift time $T_{sft}$, the blow amount $ΔN_{m2}$, and the heat generation amount InCV vary depending on the accelerator operation amount ACCP or the type of gear-shift. Further, it is possible to assign a reward r in consideration of the fact that the values of the maximum blow amount $\Delta N_{m2max}$, the gear-shift time $T_{sft}$, and the heat generation amount InCV that can be taken vary depending on the accelerator operation amount ACCP or the type of gear-shift, and further, to smoothly proceed with the learning.

Upon completing the process of S68a, the CPU 42 proceeds to the process of S72. Here, it is assumed that the relational regulation data DR stored in the storage device 46 when the vehicle VC is shipped is the learned data that has been learned by executing the same processes as those of FIG. 10 by the system illustrated in FIG. 5. In other words, the process of FIG. 10 is a process for updating the relational regulation data DR learned before the vehicle VC travels on the road to the optimum data when the vehicle VC actually travels on the road.

Third Embodiment

Hereinafter, a third embodiment will be described with reference to drawings, focusing on differences from the first embodiment.

Figure 12:
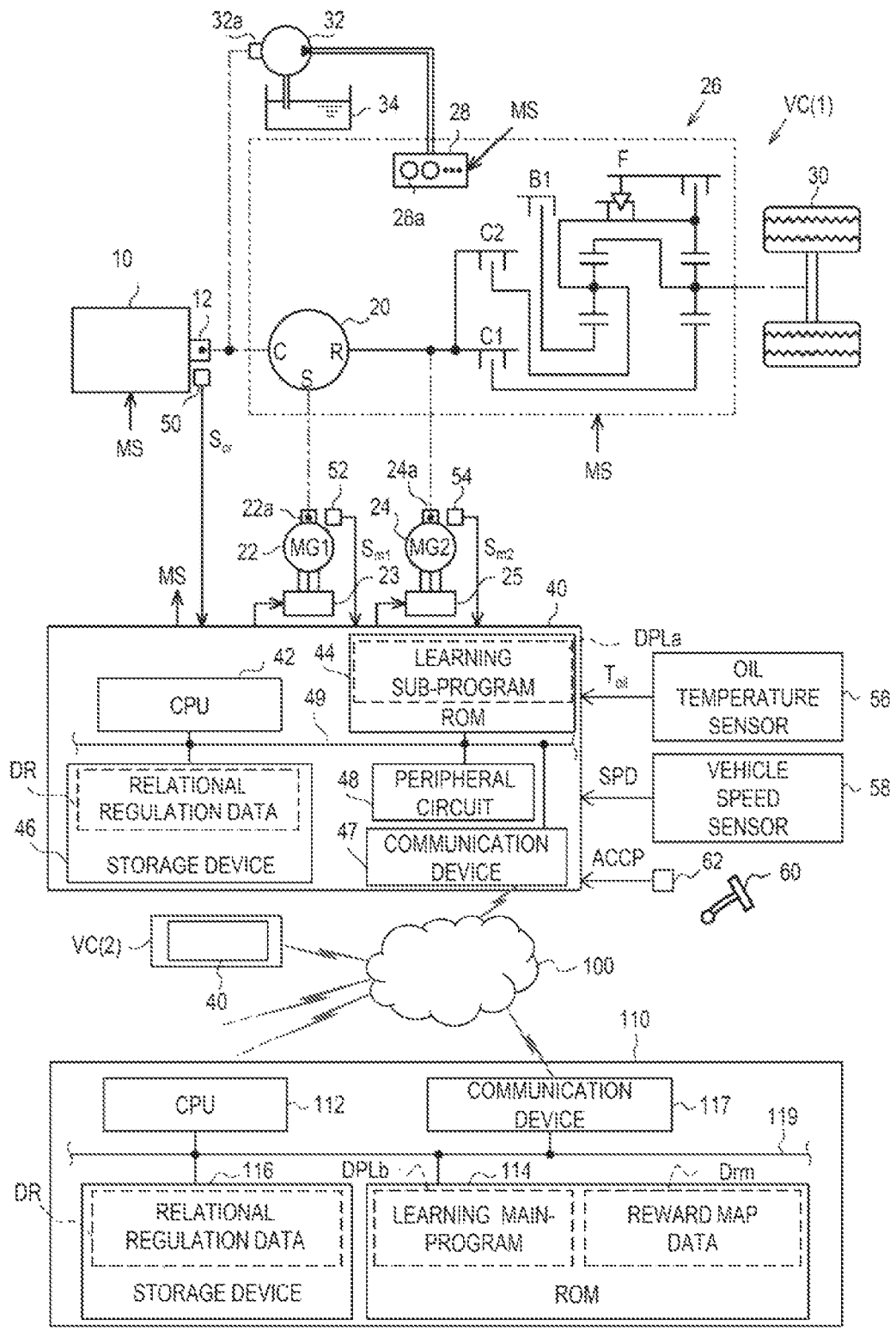
FIG. 12 is a diagram illustrating a configuration of a system according to a third embodiment.

FIG. 12 illustrates a configuration of a system according to the third embodiment. In FIG. 12, parts corresponding to those illustrated in FIG. 9 are denoted by the same reference signs for convenience, and the description thereof will be omitted. As illustrated in FIG. 12, the control device 40 of the vehicle VC(1) includes a communication device 47 and can communicate with a data analysis center 110 via an external network 100 by the communication device 47.

The data analysis center 110 analyzes the data transmitted from a plurality of vehicles VC(1), VC(2), . . . . The data analysis center 110 includes a CPU 112, a ROM 114, a storage device 116, and a communication device 117. They can communicate with each other via a local network 119. The storage device 116 is an electrically rewritable non-volatile device and stores the relational regulation data DR.

Figure 13:
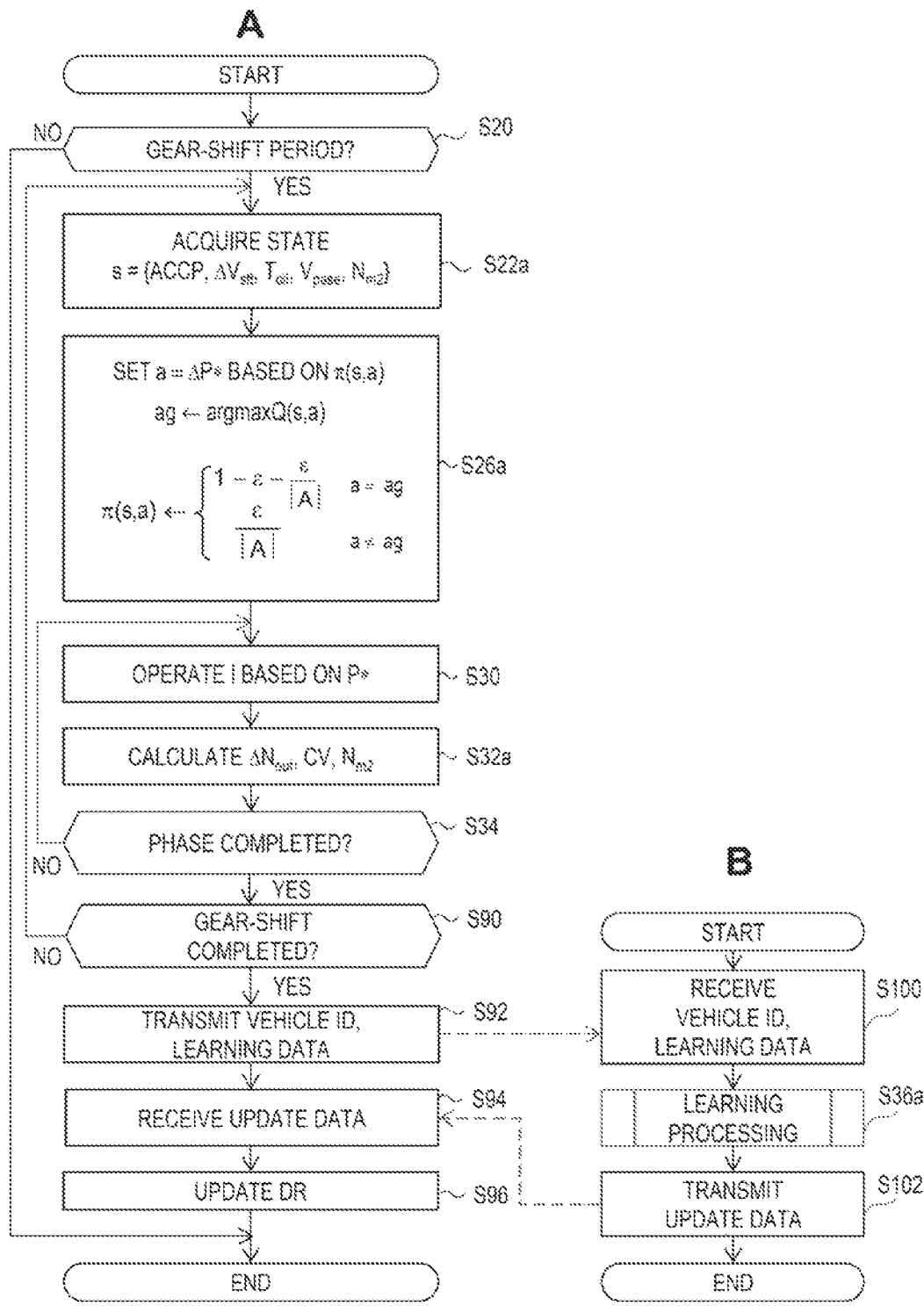
FIG. 13 shows A and B respectively illustrating procedures of processing executed by the system according to the third embodiment.

FIG. 13 illustrates a processing procedure of the reinforcement learning according to the present embodiment. Processes illustrated in A of FIG. 13 are implemented when the CPU 42 executes a learning sub-program $DPL_a$ stored in the ROM 44 illustrated in FIG. 12. Further, processes illustrated in B of FIG. 13 are implemented when the CPU 112 executes a learning main-program $DPL_b$ stored in the ROM 114. In FIG. 13, for processes corresponding to those illustrated in FIG. 10, the same step numbers are assigned for convenience. Hereinbelow, along the time series of the reinforcement learning, the processing illustrated in FIG. 13 will be described.

In the series of processes illustrated in A of FIG. 13, the CPU 42 of the control device 40 first executes the processes of S20, S22a, S26a, S30, S32a, and S34. Upon making a positive determination in the process of S34, the CPU 42 determines whether the gear-shift has been completed (S90). Upon determining that the gear-shift has not been completed yet (S90: NO), the CPU 42 returns to the process of S22a.

On the other hand, upon determining that the gear-shift has been completed (S90: YES), the CPU 42 operates the communication device 47 to transmit the data used for updating the relational regulation data DR by the reinforcement learning together with an identification code of the vehicle VC(1) (S92). This data includes the state s, the action a, the output shaft fluctuation amount $\Delta N_{out}$, the heat generation amount CV, the blow amount $\Delta N_{m2}$, and the like.

Meanwhile, as illustrated in B of FIG. 13, the CPU 112 of the data analysis center 110 receives the data for updating the relational regulation data DR (S100). Then, the CPU 112 executes a process of S36a based on the received data. Then, by operating the communication device 117, the CPU 112 transmits the data for updating the relational regulation data DR to a source from which the data received by the process of S100 is transmitted (S102). Upon completing the process of S102, the CPU 112 temporarily ends a series of processes illustrated in B of FIG. 13.

On the other hand, as illustrated in A of FIG. 13, the CPU 42 receives update data (S94). Then, the CPU 42 updates the relational regulation data DR used in the process of S26a based on the received data (S96). Upon completing the process of S96 or making a negative determination in the process of S20, the CPU 42 temporarily ends the series of processes illustrated in A of FIG. 13.

As described above, with the present embodiment, since the update processing of the relational regulation data DR is executed outside the vehicle VC(1), a calculation load on the control device 40 can be reduced. In addition, for example, in the process of S100, when data from the vehicles VC(1), VC(2), . . . is received and the process of S36a is executed, the number of pieces of data used for the learning can be easily increased.

Correspondence Relation

The correspondence relation between the items in the embodiments and items described in the "SUMMARY" is as follows. Hereinbelow, the correspondence is shown for each number described in the "SUMMARY". In said first aspect, the execution device and the storage device correspond to the CPU 82 and the ROM 84, and the storage device 86, respectively, in FIG. 5, to the CPU 42 and the ROM 44, and the storage device 46, respectively, in FIG. 9, and to the CPUs 42, 112 and the ROMs 44, 114, and the storage devices 46, 116, respectively, in FIG. 12. The acquisition process corresponds to the processes of S22, S62, S64, and S66 of FIGS. 6 and 8 or to the processes of S22a, S62, S64, S66, and S80 of FIGS. 10, 11, and 13. The operation process corresponds to the processes of S26 and S30 or to the processes of S26a and S30. The reward calculation process corresponds to the process of S68 of FIG. 8 or to the process of S68a of FIG. 11. The update process corresponds to the process of S72. The update mapping corresponds to the mapping designated by the command for executing the process of S72 in the learning program DPL or the learning main-program $DPL_b$. In other words, the update mapping corresponds to the mapping designated by the above equation (c1). The first and second variables correspond to any two variables from among three variables of the gear-shift time $T_{sft}$, the heat generation amount InCV, and the maximum output shaft fluctuation value $\Delta N_{outmax}$ in FIG. 8, and to any two variables from among four variables of the gear-shift time $T_{sft}$, the heat generation amount InCV, the maximum output shaft fluctuation value $\Delta N_{outmax}$, and the maximum blow amount $\Delta N_{m2max}$ in FIG. 11. In said first aspect, the first, second, and third variables correspond to the gear-shift time $T_{sft}$, the heat generation amount InCV, and the maximum output shaft fluctuation value $\Delta N_{outmax}$ in FIG. 8 and to any three variables from among four variables of the gear-shift time $T_{sft}$, the heat generation amount InCV, the maximum output shaft fluctuation value $\Delta N_{outmax}$, and the maximum blow amount $\Delta N_{m2max}$ in FIG. 11. An item described in said first aspect corresponds to the process of S68a. In said first aspect, the map data corresponds to the reward map data $D_{rm}$. An item described in said first aspect corresponds to the fact that the phase variable $V_{pase}$ is included in the state. An item described in said first aspect corresponds to Phase 2. In said first aspect, the torque variable corresponds to the accelerator operation amount ACCP. In paragraph said first aspect, the variable representing the rotation state of the input shaft corresponds to the rotation speed $N_{m2}$. In said first aspect, the gear-shift mapping data corresponds to the gear-shift control map data DMS. In said first aspect, the execution device and the storage device correspond to the CPU 42 and the ROM 44, and the storage device 46, respectively, in FIG. 9. In said first aspect, the first execution device corresponds to the CPU 42 and the ROM 44, and the second execution device corresponds to the CPU 112 and the ROM 114.

Other Embodiments

The present embodiment can be modified and implemented as follows. The present embodiment and the following modified examples can be implemented in combination with each other within a range in which there is no technical inconsistencies.

About State Used for Selecting Value of Action Variable Based on Relational Regulation Data The state used for selecting the value of the action variable based on the relational regulation data is not limited to those exemplified in the above embodiments. For example, in the process of S22a, the state variables that depend on the values of the action variables before Phase 2 and Phase 3 do not have to include the rotation speed $N_{m2}$, and may include, for example, the blow amount $\Delta N_{m2}$. Further, for example, they may include the heat generation amount CV. However, for example, when a profit sharing algorithm as described in a paragraph of "About Update Mapping" is used, the state variables that depend on the values of the action variables before Phase 2 and Phase 3 do not have to be included in the state used for selecting the values of the action variables.

It is not necessary to include the accelerator operation amount ACCP in the state variable.

It is not necessary to include the oil temperature $T_{oil}$ in the state variable.

It is not necessary to include the phase variable $V_{pase}$ in the state variable. For example, the time from the start of the gear-shift, the rotation speed of the input shaft, or the switching variable $\Delta V_{sft}$ may be included in the state variable to constitute an action value function Q that designates each action, and the reinforcement learning may be executed using the same action value function Q. In that case, the gear-shift period is not specified as the three phases in advance.

About Action Variable

In the processing of FIG. 6, the correction amount of the oil pressure command value or the correction amount of the pressure rise rate is used as the action variable, but a correction amount of a command value of the energizing current or a correction amount of a change speed of the energizing current may be used. Further, for example, the pressure command value or the pressure rise rate may be used as the action variable. Further, for example, the command value of the energizing current or the change speed of the command value may be used as the action variable.

In the processing of FIG. 10, as the action variable of Phase 3, the pressure rise rate is used, but the present disclosure is not limited thereto, and, for example, the pressure command value at each of stages into which phase 3 is further subdivided may be used.

In the processing of FIG. 10, the pressure command value or the pressure rise rate is used as the action variable, but the present disclosure is not limited thereto, and, for example, the command value of the energizing current to the solenoid valve 28a or the change speed of the command value may be used. Further, for example, the correction amount of the oil pressure command value, the correction amount of the pressure rise rate, the correction amount of the command value of the energizing current, or the correction amount of the change speed of the energizing current may be used.

About Relational Regulation Data

In the present embodiment, the action value function Q is set as the table-type function, but the present disclosure is not limited thereto, and, for example, a function approximation device may be used.

For example, instead of using the action value function Q, the policy π may be expressed by a function approximation device that has the state s and the action a as independent variables and a probability of taking the action a as a dependent variable, and a parameter that determines the function approximation device may be updated according to the reward r.

About Reference Method of Information on Phase in Relational Regulation Data

As described in a paragraph of "About Relational Regulation Data", when the function approximation device is used as the action value function Q, for example, the phase variable $V_{pase}$ is referred to by preparing a separate function approximation device for each phase variable $V_{pase}$. Further, for example, the phase variable $V_{pase}$ may be referred to by including the phase variable $V_{pase}$ in the independent variable of the action value function Q.

As described in the paragraph of "About Relational Regulation Data", when the policy π is expressed by the function approximation device that has the state s and the action a as the independent variables and the probability of taking the action a as the dependent variable, for example, the phase variable $V_{pase}$ is referred to by preparing a separate function approximation device for each phase variable $V_{pase}$. Further, for example, the phase variable $V_{pase}$ is referred to by including the phase variable $V_{pase}$ in the independent variable of the function approximation device.

About Operation Process

As described in the paragraph of "About Relational Regulation Data", when the function approximation device is used as the action value function Q, by inputting the action a into the action value function Q together with the state s for each of the discrete values for the action that is the independent variable of the table-type function in the embodiments, the action a that maximizes the action value function Q is selected.

As described in the paragraph of "About Relational Regulation Data", when the policy π is expressed by the function approximation device that has the state s and the action a as the independent variables and the probability of taking the action a as the dependent variable, the action a is selected based on the probability represented by the policy π.

About Update Mapping

In the process of S72, the so-called Q-learning, which is a policy-off type TD method, has been exemplified, but the present disclosure is not limited thereto, and, for example, a so-called SARSA method, which is a policy-on type TD method, may be used. However, the present disclosure is not limited to the TD method, and, for example, the Monte Carlo method or an eligibility tracing method may be used.

As the update mapping of the relational regulation data based on the reward, for example, a mapping according to the profit sharing algorithm may be used. More specifically, when an example using the mapping according to the profit sharing algorithm is used as a modified example of the process exemplified in FIG. 6 or FIG. 10, the following is executed. In other words, the reward is calculated at a stage where the gear-shift is completed. Then, the calculated reward is allocated to a rule that determines a pair of each state and action involved in the gear-shift according to a reinforcement function. Here, as the reinforcement function, for example, a well-known geometric decreasing function may be used. In particular, since the gear-shift time $T_{sft}$ has a strong correlation with the value of the action variable in Phase 3, it is effective to use the geometric decreasing function as the reinforcement function when distributing the reward according to the gear-shift time $T_{sft}$. However, the reinforcement function is not limited to the geometric decreasing function. For example, when the reward is assigned based on the heat generation amount CV, the distribution of the reward according to the heat generation amount CV to Phase 1 may be maximized in consideration of the fact that the heat generation amount CV has a strong correlation with the value of the action variable in Phase 1.

For example, as described in the paragraph of "About Relational Regulation Data", when the policy π is expressed by the function approximation device and it is directly updated based on the reward r, the update mapping is configured using a policy gradient method and the like.

The target to be directly updated by the reward r is not limited to only one of the action value function Q and the policy π. For example, the action value function Q and the policy π may be updated, respectively, as in an actor-critic method. Further, in the actor-critic method, for example, a value function V may become a target to be updated instead of the action value function Q.

About Criterion for Assigning Reward

A method of determining a criterion for a combination of a part of a plurality of required elements required for switching the gear ratio is not limited to a method using the map data that has the value of the variable representing each of the required elements as an input variable. For example, the criterion may be determined by setting the variable representing each required element as a variable having a value that is equal to or greater than zero, and is more desirable as it is greater than zero, setting a Cartesian coordinate system having as many dimensions as the number of variables, and setting, as the reward, the volume of a polygon having a value of each variable and the origin as vertices. In other words, in that case, even when a part of the variables has an excessively large value, in a case where a value of one variable is zero, the volume becomes zero. Thus, when a part of the required elements is satisfied while the other elements are not satisfied, it can be considered that the criterion for assigning a high reward is not satisfied. In other words, satisfying the required elements in a well-balanced manner can be used as the criterion for assigning the high reward.

About Reward Calculation Process

In the above embodiments, the reward r is set as zero in Phase 1 and Phase 2, but the present disclosure is not limited thereto. For example, in Phase 1, a higher reward may be assigned when the heat generation amount CV in Phase 1 is small than when it is large. Further, for example, in Phase 2, a higher reward may be assigned when the heat generation amount CV in Phase 2 is small than when it is large. Further, for example, in Phase 2, a higher reward may be assigned when the blow amount $\Delta N_{m2}$ in Phase 2 is small than when it is large.

The process for assigning a higher reward when a heat generation amount is small than when it is large is not limited to the process for assigning a higher reward when the heat generation amount InCV is small than when it is large. For example, a higher reward may be assigned when the maximum value of the heat generation amount CV per unit time within the gear-shift period is small than when it is large.

The variable representing the amount in which the rotation speed of the input shaft of the transmission exceeds the reference rotation speed is not limited to the maximum blow amount $\Delta N_{m2max}$, and may be, for example, the average value of the blow amount $\Delta N_{m2}$ during the gear-shift period. Further, for example, it may be a variable in which an amount where a rotation speed of the input shaft when a gear-shift command is output exceeds the reference rotation speed is quantified.

The impact amount generated when switching the gear ratio is not limited to an amount quantified by the maximum output shaft fluctuation value $\Delta N_{outmax}$, that is, the maximum value of the output shaft fluctuation amount $\Delta N_{out}$, which is the fluctuation amount of the rotation speed of the output shaft of the transmission 26. For example, it may be quantified by the average value of the output shaft fluctuation amount $\Delta N_{out}$. Further, it is not limited to an amount quantified using the output shaft fluctuation amount $\Delta N_{out}$, and may be quantified by, for example, the acceleration of the vehicle detected by an acceleration sensor.

In the process of S68, the process for assigning a higher reward when the gear-shift time $T_{sft}$ is short than when it is long, the process for assigning a higher reward when the impact amount generated when switching the gear ratio is small than when it is large, and the process for assigning a higher reward when the heat generation amount InCV is small than when it is large are executed, but the present disclosure is not limited thereto. For example, only two of these three processes may be executed. Further, for example, at least one of these three processes and a process for assigning a higher reward when the amount in which the rotation speed of the input shaft of the transmission exceeds the reference rotation speed is small than when it is large may be executed.

In the process of S68a, even in a combination where the values of four variables of the gear-shift time $T_{sft}$, the impact amount generated when switching the gear ratio, the heat generation amount CV, and the amount in which the rotation speed of the input shaft of the transmission exceeds the reference rotation speed are the same, the value of the reward is variable depending on the accelerator operation amount ACCP or the type of gear-shift, but the present disclosure is not limited thereto. For example, the value of the reward may be variable depending on the accelerator operation amount ACCP, but does not have to be variable depending on the type of gear-shift. Further, for example, the value of the reward may be variable depending on the type of gear-shift, but does not have to be variable depending on the accelerator operation amount ACCP. In addition, for example, the value of the reward may be set to be constant for the combination where the values of four variables are the same regardless of the accelerator operation amount and the type of gear-shift.

In the process of S68a, the reward is assigned for the combination of the values of four variables of the gear-shift time $T_{sft}$, the impact amount generated when switching the gear ratio, the heat generation amount CV, and the amount in which the rotation speed of the input shaft of the transmission exceeds the reference rotation speed, but the present disclosure is not limited thereto. For example, the reward may be assigned for a combination of the values of only three of the four variables. Further, for example, the reward may be assigned for a combination of the values of only two of the four variables. In these cases, it is not necessary that the value of the reward is variable depending on the accelerator operation amount ACCP or the type of gear-shift. For example, the value of the reward may be variable depending on the accelerator operation amount ACCP, but does not have to be variable depending on the type of gear-shift. Further, for example, the value of the reward may be variable depending on the type of gear-shift, but does not have to be variable depending on the accelerator operation amount ACCP. In addition, for example, the value of the reward may be set to be constant for a combination where the values of at least two variables from among the four variables are the same.

The reward calculation process is not limited to setting the criterion for the combination of all the values of variables representing each of the required elements to be rewarded. For example, while determining a criterion for assigning a reward for the combination of the values of three variables of the gear-shift time $T_{sft}$, the impact amount generated when switching the gear ratio, and the heat generation amount CV, independent of the determined criterion, a process for assigning a higher reward when the amount in which the rotation speed of the input shaft of the transmission exceeds the reference rotation speed is small than when it is large may be executed.

About Vehicle Control Data Generation Method

In the process of S26 of FIG. 6, the action is determined based on the action value function Q, but the present disclosure is not limited thereto, and all actions that can be taken may be selected with the equal probability.

About Gear-shift Mapping Data

The gear-shift mapping data that receives the state of the vehicle as an input and outputs the value of the action variable that maximizes the expected profit by associating the state of the vehicle with the value of the action variable that maximizes the expected profit on a one-to-one basis is not limited to the map data. For example, it may be a function approximation device. For example, as described in the paragraph of "About Update Mapping", this can be implemented by, when the policy gradient method or the like is used, expressing the policy π by a Gaussian distribution representing the probability with which the value of the action variable can be taken, expressing the average value thereof by the function approximation device, updating a parameter of the function approximation device that expresses the average value, and using the average value after learning as the gear-shift map data. In other words, here, the average value output by the function approximation device is regarded as the value of the action variable that maximizes the expected profit.

About Gear-shift Control System

In the example illustrated in FIG. 13, the process for determining the action based on the policy π (the process of S26a) is executed on the vehicle side, but the present disclosure is not limited thereto. For example, the data acquired by the process of S22a may be transmitted from the vehicle VC(1), the action a may be determined using the data transmitted at the data analysis center 110, and the determined action may be transmitted to the vehicle VC(1).

The gear-shift control system is not limited to a system composed of the control device 40 and the data analysis center 110. For example, instead of the data analysis center 110, a user's mobile terminal may be used. Further, the gear-shift control system may be composed of the control device 40, the data analysis center 110, and the mobile terminal. This can be implemented by, for example, executing the process of S26a by the mobile terminal.

About Execution Device

The execution device is not limited to including the CPU 42(112) and the ROM 44(114) and executing software processing. For example, a dedicated hardware circuit, such as an ASIC, which processes at least a part of the processes by software in the above embodiments by hardware may be provided. In other words, the execution device may have any of the following configurations (a) to (c). (a) A processing device, which executes all of the above processing according to a program, and a program storage device, such as a ROM, which stores the program, are provided. (b) A processing device, which executes a part of the above processing according to a program, a program storage device, and a dedicated hardware circuit, which executes the remaining processing, are provided. (c) A dedicated hardware circuit, which executes all of the above processing, is provided. Here, a plurality of software execution devices including a processing device and a program storage device, and a plurality of dedicated hardware circuits may be used.

About Storage Device

In the above embodiment, the storage device that stores the relational regulation data DR and the storage device (the ROM 44, 114) that stores the learning program DPL, the learning sub-program $DPL_a$, or the learning main-program $DPL_b$ are used as separate storage devices. However, it is not limited thereto.

About Vehicle

The vehicle is not limited to a series and parallel hybrid vehicle. For example, it may be a series hybrid vehicle or a parallel hybrid vehicle. As an in-vehicle rotating machine, the vehicle is not limited to including the internal combustion engine and the motor generator. For example, the vehicle may have the internal combustion engine but not the motor generator, or the vehicle may have the motor generator but not the internal combustion engine.

Others

The transmission is not limited to the transmission 26 exemplified in FIG. 1 and the like.

What is claimed is:

1. A gear-shift control data generation method executed by an execution device in a state where relational regulation data used for regulating a relationship between a state of a vehicle and an action variable is stored in a storage device, the action variable being a variable associated with an operation of a transmission mounted on the vehicle, the gear-shift control data generation method comprising:

an acquisition process for acquiring the state of the vehicle based on a detection value of a sensor;

an operation process for operating the transmission to switch a gear ratio;

a reward calculation process for assigning, based on the state of the vehicle acquired by the acquisition process, a higher reward when a characteristic of the vehicle satisfies a criterion than when the characteristic does not satisfy the criterion; and an update process for updating the relational regulation data by inputting, to an update mapping determined in advance, the state of the vehicle acquired by the acquisition process, a value of the action variable used for the operation of the transmission, and a reward corresponding to the operation, wherein:

the update mapping outputs the relational regulation data that is updated to increase an expected profit for the reward when the transmission is operated according to the relational regulation data; and the criterion when the reward is assigned by the reward calculation process is defined for a combination of values of a first variable and a second variable that are two from among four variables of a gear-shift time required for switching the gear ratio, a heat generation amount of the transmission during a period of switching the gear ratio, an amount in which a rotation speed of an input shaft during the period of switching the gear ratio exceeds a reference rotation speed, and an impact amount generated when switching the gear ratio.

2. The gear-shift control data generation method according to claim 1, wherein the criterion when the reward is assigned by the reward calculation process is defined for a combination of values of the first variable, the second variable, and a third variable that are three of the four variables.

3. The gear-shift control data generation method according to claim 1, wherein, even in a combination where values of the respective variables are the same, the reward calculation process includes a process for changing a value of the reward according to at least one of two variables that are a torque variable representing torque applied to the transmission and a switching variable representing a kind of switching the gear ratio.

4. The gear-shift control data generation method according to claim 1, wherein:
the storage device stores map data that has values of at least the first and second variables as input variables and has a value of the reward as an output variable; and
the reward calculation process includes a process for map-calculating the reward based on the values of the first and second variables.

5. The gear-shift control data generation method according to claim 1, wherein information on a plurality of phases into which the period of switching the gear ratio is divided is referred to from the relational regulation data when the value of the action variable is determined by the relational regulation data.

6. The gear-shift control data generation method according to claim 5, wherein the phases include a phase that is ended when transmitting torque by a friction engaging element is ended, the friction engaging element being switched from an engaged state to a released state by switching the gear ratio of the transmission.

7. The gear-shift control data generation method according to claim 1, wherein a variable representing the state of the vehicle of which the relationship with the value of the action variable is regulated by the relational regulation data includes a torque variable representing torque applied to the transmission, a switching variable representing a kind of switching the gear ratio, and a temperature variable representing a temperature of hydraulic oil of the transmission.

8. The gear-shift control data generation method according to claim 1, wherein a variable representing the state of the vehicle of which the relationship with the value of the action variable is regulated by the relational regulation data includes a variable representing a rotation state of the input shaft of the transmission.

9. The gear-shift control data generation method according to claim 1, further comprising:
a process for generating gear-shift mapping data that receives the state of the vehicle as an input and outputs an operation amount of the transmission that maximizes the expected profit, by associating the state of the vehicle with the value of the action variable that maximizes the expected profit based on the relational regulation data, which is updated by the update process.

10. A gear-shift control device comprising:
the execution device and the storage device in the gear-shift control data generation method according to claim 1,
wherein the operation process is a process for operating the transmission to switch the gear ratio based on the value of the action variable that is determined by the relational regulation data and the state of the vehicle, which is acquired by the acquisition process.

11. A gear-shift control system comprising:
the execution device and the storage device in the gear-shift control data generation method according to claim 1, wherein:
the execution device includes a first execution device mounted on the vehicle, and a second execution device separate from an in-vehicle device;
the first execution device executes at least the acquisition process and the operation process; and
the second execution device executes at least the update process.

* * * * *

UNITED STATES PATENT AND TRADEMARK OFFICE
CERTIFICATE OF CORRECTION

PATENT NO. : 11,236,819 B1
APPLICATION NO. : 17/344369
DATED : February 1, 2022
INVENTOR(S) : Kota Fujii et al.

It is certified that error appears in the above-identified patent and that said Letters Patent is hereby corrected as shown below:

On the Title Page

Item (54) and in the Specification Column 1 Lines 1-4 should read:
GEAR-SHIFT CONTROL DATA GENERATION METHOD, GEAR-SHIFT CONTROL DEVICE, AND GEAR-SHIFT CONTROL SYSTEM Signed and Sealed this
Tenth Day of May, 2022

Katherine Kelly Vidal
*Director of the United States Patent and Trademark Office*